United States Patent
Matsoukas et al.

(10) Patent No.: US 10,522,134 B1
(45) Date of Patent: *Dec. 31, 2019

(54) SPEECH BASED USER RECOGNITION

(71) Applicant: Amazon Technologies, Inc., Seattle, WA (US)

(72) Inventors: Spyridon Matsoukas, Hopkinton, MA (US); Aparna Khare, San Jose, CA (US); Vishwanathan Krishnamoorthy, Lexington, MA (US); Shamitha Somashekar, Cupertino, CA (US); Arindam Mandal, Redwood City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/388,458

(22) Filed: Dec. 22, 2016

(51) Int. Cl.
*G10L 15/01* (2013.01)
*G10L 15/25* (2013.01)
*G10L 15/30* (2013.01)

(52) U.S. Cl.
CPC .............. *G10L 15/01* (2013.01); *G10L 15/25* (2013.01); *G10L 15/30* (2013.01)

(58) Field of Classification Search
USPC .......................... 704/246, 247, 251, 252, 255
See application file for complete search history.

(56) References Cited

U.S. PATENT DOCUMENTS

| | | | |
|---|---|---|---|
| 9,147,399 B1 | 9/2015 | Hart et al. | |
| 9,460,715 B2 | 10/2016 | Hart et al. | |
| 9,729,821 B1* | 8/2017 | Fineberg | H04N 7/148 |
| 2011/0243449 A1* | 10/2011 | Hannuksela | G06K 9/00221 382/190 |
| 2015/0037765 A1* | 2/2015 | Jaggi | G09B 7/02 434/169 |
| 2016/0063471 A1* | 3/2016 | Kobres | G06F 21/316 705/18 |
| 2016/0125879 A1* | 5/2016 | Lovitt | G10L 17/10 704/275 |
| 2017/0091433 A1* | 3/2017 | Anderson | G06F 21/32 |
| 2017/0109448 A1* | 4/2017 | Adamy | G06F 17/30867 |

OTHER PUBLICATIONS

Oku et al. "Low-latency speaker diarization based on Bayesian information criterion with multiple phoneme classes." In 2012 IEEE International Conference on Acoustics, Speech and Signal Processing (ICASSP), pp. 4189-4192. IEEE, 2012.

* cited by examiner

*Primary Examiner* — Leonard Saint Cyr
(74) *Attorney, Agent, or Firm* — Pierce Atwood LLP

(57) ABSTRACT

Systems, methods, and devices for verifying a user are disclosed. A speech-controlled device captures a spoken command, and sends audio data corresponding thereto to a server. The server performs ASR on the audio data to determine ASR confidence data. The server, in parallel, performs user verification on the audio data to determine user verification confidence data. The server may modify the user verification confidence data using the ASR confidence data. In addition or alternatively, the server may modify the user verification confidence data using at least one of a location of the speech-controlled device within a building, a type of the speech-controlled device, or a geographic location of the speech-controlled device.

20 Claims, 11 Drawing Sheets

SPEECH BASED USER RECOGNITION

BACKGROUND

Speech recognition systems have progressed to the point where humans can interact with computing devices by speaking. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
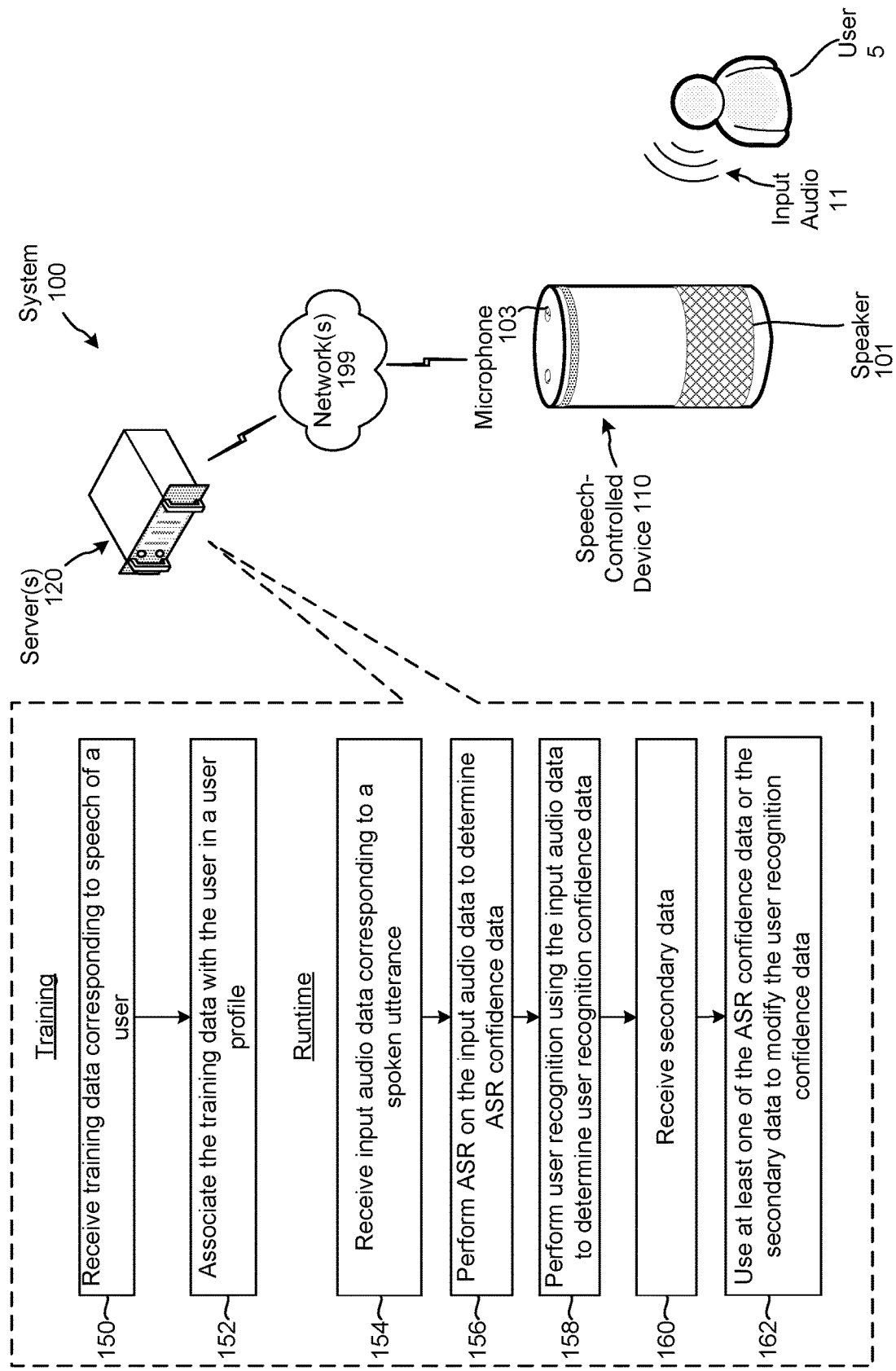
FIG. 1 illustrates a system for verifying an identity of a user that speaks an utterance according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Speech processing systems have become robust platforms enabled to perform a variety of speech related tasks such as playing music, controlling household devices, communicating with other users, shopping, etc. Speech processing systems may process a spoken utterance to obtain content responsive thereto (for example output music, news content, or the like). Speech processing systems may also process a spoken utterance, and therefrom perform TTS processing to create computer-generated speech responsive to the spoken utterance thus enabling the system to engage in a conversation with a user and provide feedback and prompts in spoken form.

In certain situations, it may be desirable for a speech processing system to verify the identity of a speaking user. Identification of a user refers to determining an identity of a user. Verification refers to confirming a previously determined identity of a user. Recognition of users refers to both identification and verification of a user. Some speech processing systems may perform user recognition through speech analysis (i.e., the system may verify whether a spoken utterance originated from a particular user by using the audio data of the utterance) and/or through different techniques. Such user verification may be desired prior to performing certain tasks such as controlling a home device, accessing a user's sensitive information, or addressing the user by name in a TTS response. Further, in other situations, two different users may speak the same utterance, but intend to receive different content in response thereto. Thus, it may be desirable for the system to determine who spoke the utterance (and verify such user) in order to properly process the command. For example, two different users may both state "Play my music," with one of the users intending to have a classical music playlist played and the other user intending to have a rock music playlist played. As such, speech processing systems may utilize user recognition to influence which eventual content is determined to be responsive to a spoken utterance. Traditional user recognition determines a similarity between speech characteristics (i.e., features) of a spoken utterance and speech characteristics of test/training speech. The test/training speech is often spoken during enrollment of a user with the speech processing system. For example, when a user enrolls in the speech processing system, the system may request the user speak certain phrases, which are stored and used for comparison purposes during user recognition.

The present disclosure improves traditional user recognition, and increases the accuracy thereof, by incorporating a confidence output of an ASR component into the user recognition analysis. Instead of simply using speech characteristics of a spoken utterance to determine a similarity with stored test/training speech characteristics, as is the case with traditional speech based user recognition, the present disclosure may use both the characteristics of the spoken utterance as well as ASR confidence output.

The present disclosure also improves traditional user recognition by incorporating secondary information into the user recognition analysis. Such secondary information may include, for example, where an audio capture device is located within a building (e.g., home), a type of the audio capture device, a geographic location of the audio capture device, etc. Further, the secondary information may include image data (such as from a camera that may capture an image of a speaking user), other device data (such as knowing where a user's wearable device is relative to an audio capture device), or the like.

The teachings of the present disclosure are beneficial because they decrease the amount of false user verifications, decrease the likelihood of unintentional divulgation of data to an incorrectly recognized user, and generally improve system performance.

FIG. 1 illustrates a system 100 configured to recognize an identity of a user according to the present disclosure. Although the figures and discussion illustrate certain operational steps of the system 100 in a particular order, the steps described may be performed in a different order (as well as certain steps removed or added) without departing from the intent of the disclosure. As shown in FIG. 1, the system 100 may include one or more speech-controlled devices 110 local to a user 5, and one or more servers 120 connected to the speech-controlled device(s) 110 across one or more networks 199. The server(s) 120 (which may be one or more different physical devices) may be capable of performing speech processing (e.g., ASR, NLU, command processing, etc.), TTS processing, and user recognition as described herein. A single server 120 may perform all speech processing, TTS processing, and user recognition. Alternatively, multiple servers 120 may combine to perform all speech processing, TTS processing, and user recognition. Further, the server(s) 120 may execute certain commands, such as answering spoken utterances of the user 5. In addition, certain speech detection or command execution functions may be performed by the speech-controlled device 110.

As illustrated in FIG. 1, during a training phase, the speech-controlled device 110 may capture various speech (i.e., input audio 11) of the user 5 via a microphone 103 of the speech-controlled device 110. For example, capturing of the training speech may occur as part of enrolling the user with the speech-controlled device 110/system 100. The speech-controlled device 110 may then send training data corresponding to the training speech to the server(s) 120. Alternatively, a microphone array (not illustrated), separate from the speech-controlled device 110, may capture the training speech. In an example, the microphone array is in direct communication with the speech-controlled device 110 such that when the microphone array captures the training speech, the microphone array sends the training data to the speech-controlled device 110. The speech-controlled device 110 may then forward the received training data to the server(s) 120. In another example, the microphone array is in indirect communication with the speech-controlled device 110 via a companion application of a mobile computing device, such as a smart phone, tablet, laptop, etc. In this example, when the microphone array captures the training speech, the microphone array sends the training data to the companion application, which forwards the training data to the speech-controlled device 110. The speech-controlled device 110 may then forward the training data to the server(s) 120. In yet another example, the microphone array is in indirect communication with the server(s) 120 via the companion application such that when the microphone array captures the training speech, the microphone array sends the training data to the companion application, which forwards the training data to the server(s) 120.

The server(s) 120 receives (150) the training data and associates (152) the training data with the user 5 in a user profile associated with the speech-controlled device 110 from which the training data originated. It should be appreciated that the server(s) 120 may receive (150) training data from multiple speech-controlled devices 110 of the system 100, and may store the training data with respective users and user profiles.

The server(s) 120 may simply store, in the user profile, waveforms of training data without determining features/vectors of the training data. In this example, features/vectors of the training data may be determined each time the server(s) 120 attempts to compare features/vectors of a spoken utterance to the training data. Alternatively, upon receiving (150) training data, the server(s) 120 may determine features/vectors of the training data and associate (152) the features/vectors of the training data with the user in the user profile. This allows the server(s) 120 to only determine the features/vectors of the training data once, thereby negating duplicative processing.

During runtime, as shown in FIG. 1, the microphone 103 of the speech-controlled device 110 (or a separate microphone array depending upon implementation) captures an utterance (i.e., input audio 11) spoken by the user 5. The server(s) 120 receives (154) input audio data corresponding to the spoken utterance from the speech-controlled device 110 or a companion application (depending upon implementation as described herein above). The server(s) 120 may perform (156) ASR on the input audio data to determine ASR confidence data indicating an ASR confidence. The server(s) 120 may also perform (158) user recognition using the input audio data to determine user recognition confidence data indicating a user verification confidence. Performing user recognition may include comparing speech characteristics (i.e., features/vectors) of the input audio data to speech characteristics of training data stored in a user profile associated with the speech-controlled device 110 from which the input audio data was received. The server(s) 120 may perform (156) ASR and perform (158) user recognition in parallel. The server(s) 120 may also receive (160) secondary data, such as where the speech-controlled device 110 (or microphone array) is located within a building (e.g., home), a type of the speech-controlled device 110, and a geographic location of the speech-controlled device 110, for example. The server(s) 120 may use (162) at least one of the ASR confidence data or the secondary data to alter/modify the originally determined user recognition confidence data.

As described above, user recognition may be performed using training data captured while enrolling the user with the system 100/speech-controlled device 110. However, it should be appreciated that user recognition may be performed without using training data captured during an enrollment process. For example, reference data used to perform user recognition may be captured during runtime (i.e., when the user interacts with the system 100 at runtime by, for example, speaking commands).

Figure 2:
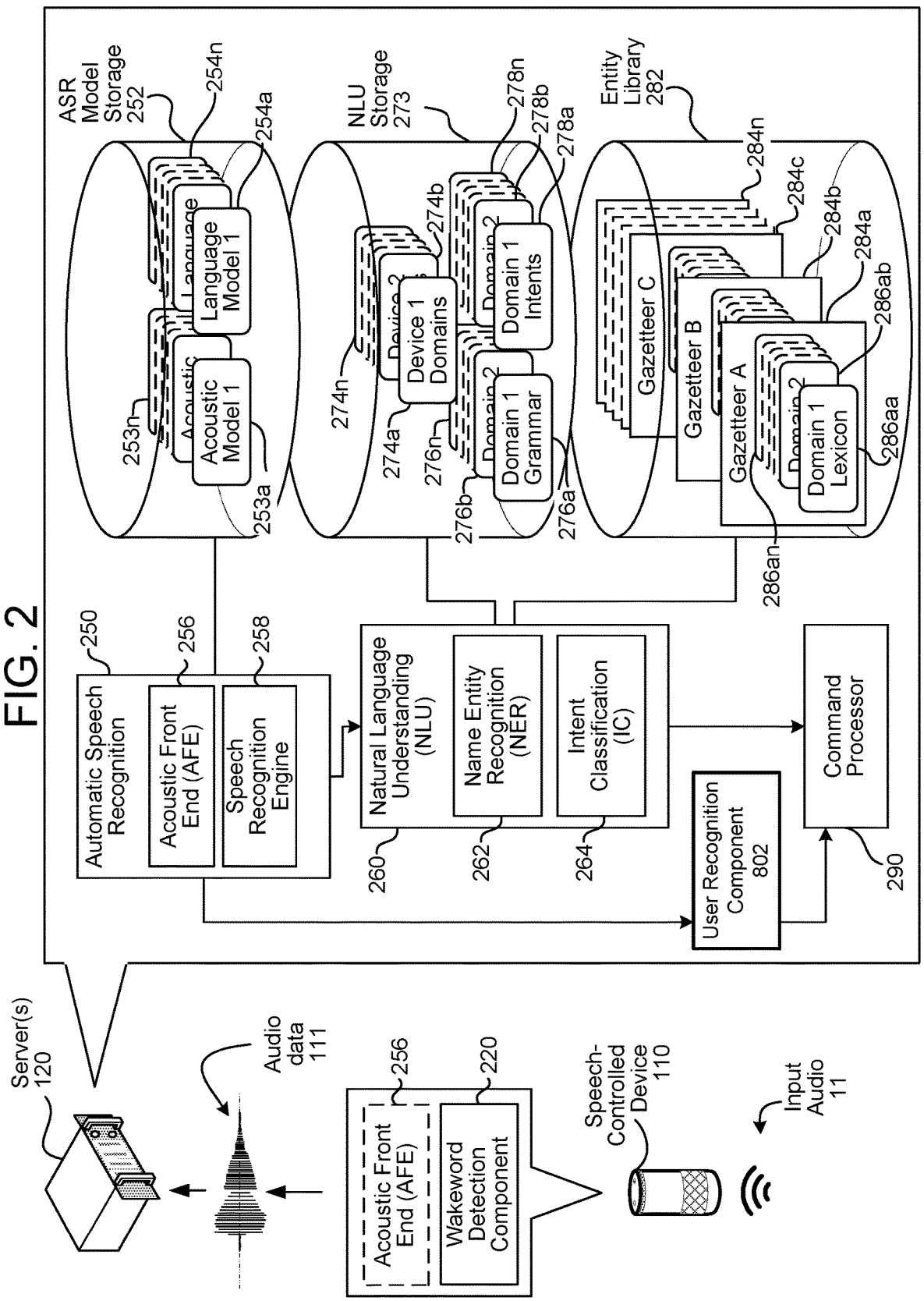
FIG. 2 is a conceptual diagram of how a spoken utterance may be processed according to embodiments of the present disclosure.

Further details of the system 100 configured to verify a user that speaks an utterance are explained below, following a discussion of the overall speech processing system of FIG. 2. The system 100 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. An audio capture component, such as the microphone 103 of the speech-controlled device 110 (or other device), captures input audio 11 corresponding to a spoken utterance. The device 110, using a wakeword detection component 220, then processes audio data corresponding to the input audio 11 to determine if a keyword (such as a wakeword) is detected in the audio data. Following detection of a wakeword, the speech-controlled device 110 sends audio data 111, corresponding to the utterance, to a server 120 that includes an ASR component 250. The audio data 111 may be output from an acoustic front end (AFE) 256 located on the device 110 prior to transmission, or the audio data 111 may be in a different form for processing by a remote AFE 256, such as the AFE 256 located with the ASR component 250.

The wakeword detection component 220 works in conjunction with other components of the device 110, for example the microphone 103 to detect keywords in audio data corresponding to the input audio 11. For example, the device 110 may convert input audio 11 into audio data, and process the audio data with the wakeword detection component 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in input audio based on various quantitative aspects of the input audio, such as a spectral slope between one or more frames of the input audio; energy levels of the input audio in one or more spectral bands; signal-to-noise ratios of the input audio in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the input audio to one or more acoustic models in speech storage, which acoustic models may include models corresponding to speech, noise (such as environmental noise or background noise), or silence. Still other techniques may be used to determine whether speech is present in the input audio.

Once speech is detected in the input audio, the device 110 may use the wakeword detection component 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis, or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection component 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each wakeword and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN)-HMM decoding framework. In another embodiment the wakeword spotting system may be built on DNN/recursive neural network (RNN) structures directly, without HMM involved. Such a system may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing (e.g., for purposes of executing a command in the speech). The audio data 111 may include data corresponding to the wakeword, or the portion of the audio data corresponding to the wakeword may be removed by the local device 110 prior to sending the audio data 111 to the server 120.

Upon receipt by the server(s) 120, an ASR component 250 may convert the audio data 111 into text data. The ASR component 250 transcribes the audio data 111 into text data representing words of speech contained in the audio data 111. The text data may then be used by other components for various purposes, such as executing system commands, inputting data, etc. A spoken utterance in the audio data 111 is input to a processor configured to perform ASR, which then interprets the spoken utterance based on a similarity between the spoken utterance and pre-established language models 254 stored in an ASR model knowledge base (i.e., ASR model storage 252). For example, the ASR component 250 may compare the audio data 111 with models for sounds (e.g., subword units or phonemes) and sequences of sounds to identify words that match the sequence of sounds spoken in the spoken utterance of the audio data 111.

The different ways a spoken utterance may be interpreted (i.e., the different hypotheses) may each be assigned a respective probability/confidence score representing a likelihood that a particular set of words matches those spoken in the spoken utterance. The confidence score may be based on a number of factors including, for example, a similarity of the sound in the spoken utterance to models for language sounds (e.g., an acoustic model 253 stored in the ASR model storage 252), and a likelihood that a particular word that matches the sound would be included in the sentence at the specific location (e.g., using a language model 254 stored in the ASR model storage 252). Thus, each potential textual interpretation of the spoken utterance (i.e., hypothesis) is associated with a confidence score. Based on the considered factors and the assigned confidence score, the ASR component 250 outputs the most likely text recognized in the audio data 111. The ASR component 250 may also output multiple hypotheses in the form of a lattice or an N-best list with each hypothesis corresponding to a confidence score or other score (e.g., such as probability scores, etc.).

The device or devices including the ASR component 250 may include an AFE 256 and a speech recognition engine 258. The AFE 256 transforms the audio data 111 into data for processing by the speech recognition engine 258. Such transformation is discussed in further detail with regard to FIG. 6 below. The speech recognition engine 258 compares the speech recognition data with acoustic models 253, language models 254, and other data models and information for recognizing the speech conveyed in the audio data 111. The AFE 256 may reduce noise in the audio data 111 and divide the digitized audio data 111 into frames representing time intervals for which the AFE 256 determines a number of values (i.e., features) representing qualities of the audio data 111, along with a set of those values (i.e., a feature vector or audio feature vector) representing features/qualities of the audio data 111 within each frame. In one configuration each audio frame includes 25 ms of audio and the frames start at 10 ms intervals resulting in a sliding window where adjacent audio frames include 15 ms of overlapping audio. Many different features may be determined, as known in the art, and each feature represents some quality of the audio data 111 that may be useful for ASR processing. A number of approaches may be used by the AFE 256 to process the audio data 111, such as mel-frequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition engine 258 may process data output from the AFE 256 with reference to information stored in the ASR model storage 252. Alternatively, post-AFE processed data (e.g., feature vectors) may be received by the device executing ASR processing from another source besides the internal AFE 256. For example, the speech-controlled device 110 may process audio data 111 into feature vectors (e.g., using an on-device AFE 256) and transmit the feature vector data to the server 120 across the network 199 for ASR processing. Feature vector data may arrive at the server 120 encoded, in which case it may be decoded prior to processing by the processor executing the speech recognition engine 258.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output speech results that make sense grammatically.

The speech recognition engine 258 may use a number of techniques to match feature vectors to phonemes, for example using HMMs to determine probabilities that feature vectors may match phonemes. Sounds received may be represented as paths between states of the HMM and multiple paths may represent multiple possible text matches for the same sound.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as the server 120, for natural language understanding (NLU) processing, such as conversion of the text data into commands for execution, either by the speech-controlled device 110, by the server 120, or by another device (e.g., a server running a search engine, etc.). For example, the ASR component 250 may output text data 300 for further processing by an NLU 260, where the text data 300 may include a single top scoring hypothesis or a N-best list including multiple hypotheses. Further, the ASR component 250 may output ASR confidence score data 807 for further processing by a user verification component 802 (discussed below) or other component. The ASR confidence score data 807 may include a respective score for each hypothesis in an N-best list or may include a single score for the top hypothesis output as the text data 300. In other configurations the ASR confidence score data 807 may include general confidence data, such as one or more values that indicate how generally confident the ASR component 250 was in its processing, without necessarily linking that confidence to a specific hypothesis. The ASR confidence score data 807 may be based on various factors such as audio quality, whether the hypotheses had similar scores or whether one hypothesis largely outscored the others, or other factors.

The device performing NLU processing (e.g., the server 120) may include various components, including potentially dedicated processor(s), memory, storage, etc. The device performing NLU processing may include a dedicated NLU component/component 260, which may include a named entity recognition (NER) component 262, and intent classification (IC) component 264. The device performing NLU processing may additionally include NLU storage 273, and a knowledge base (not illustrated). The knowledge base is a database or other information storage that may include information about entities that may be used in resolving spoken utterances. The NLU component 260 may also utilize gazetteer information 284 stored in an entity library storage 282. The knowledge base and/or gazetteer information 284 may be used for entity resolution, for example matching ASR results with different entities (e.g., song titles, contact names, etc.). Gazetteers 284 may be linked to users (e.g., a particular gazetteer may be associated with a specific user's music collection), may be linked to certain domains (e.g., shopping), or may be organized in a variety of other ways.

The NLU component 260 takes text data (e.g., output from the ASR component 250 based on the input audio data 111) and attempts to make a semantic interpretation of the text data. That is, the NLU component 260 determines the meaning behind the text data based on the individual words and then implements that meaning. The NLU component 260 interprets a text string to derive an intent or a desired action from the user as well as the pertinent pieces of information in the text data that allow a device (e.g., the speech-controlled device 110, the server 120, an application server, etc.) to complete that action. For example, if a spoken utterance is processed using the ASR component 250, which outputs the text data "call mom", the NLU component 260 may determine the user intended to activate a telephone in his/her device and to initiate a call with a contact matching the entity "mom."

The NLU component 260 may process several textual inputs related to the same utterance. For example, if the ASR component 250 outputs N text segments (e.g., as part of an N-best list), the NLU component 260 may process all N outputs to obtain NLU results.

The NLU component 260 may be configured to parse and tag to annotate text data as part of NLU processing. For example, for the text data "call mom," "call" may be tagged as a command (e.g., to execute a phone call) and "mom" may be tagged as a specific entity and target of the command. In addition, the telephone number for the entity corresponding to "mom" stored in a contact list may be included in the annotated NLU results.

To correctly perform NLU processing of speech input, the NLU component 260 may be configured to determine a "domain" of the utterance so as to determine and narrow down which services offered by an endpoint device (e.g., the server 120, the speech-controlled device 110, an application server, etc.) may be relevant. For example, an endpoint device may offer services relating to interactions with a telephone service, a contact list service, a calendar/scheduling service, a music player service, etc. Words in text data may implicate more than one service, and some services may be functionally linked (e.g., both a telephone service and a calendar service may utilize data from the contact list).

The NER component 262 receives an utterance in the form of ASR results and attempts to identify relevant grammars and lexical information that may be used to construe meaning. To do so, the NER component 262 may begin by identifying potential domains that may relate to the received utterance. The NLU storage 273 includes a database of domains 274 associated with specific devices. For example, the speech-controlled device 110 may be associated with domains for music, telephony, calendaring, contact lists, and device-specific communications. In addition, the entity library 282 may include database entries about specific services on a specific device, either indexed by Device ID, User ID, Household ID, or some other indicator.

A domain may represent a discrete set of activities having a common theme, such as "shopping", "music", "calendaring", etc. As such, each domain may be associated with a particular language model and/or grammar database 276, a particular set of intents/actions 278, and/or a particular personalized lexicon 286. Each gazetteer 284 may include domain-indexed lexical information associated with a particular user and/or device. For example, the Gazetteer A 284a includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both communications and music, the utterance will be NLU processed using the grammar models and lexical information for communications, and will also be processed using the grammar models and lexical information for music. The responses to the spoken utterance produced by each set of models is scored, with the overall highest ranked result from all applied domains being ordinarily selected to be the correct result. This is described further in detail below in reference to FIG. 3.

An IC component 264 parses the utterance to determine an intent(s) for each identified domain, where the intent(s) corresponds to the action to be performed that is responsive to the spoken utterance. Each domain is associated with a database 278 of words linked to intents. For example, a music intent database may link words and phrases such as "quiet," "volume off," and "mute" to a "mute" intent. The IC component 264 identifies potential intents for each identified domain by comparing words in the utterance to the words and phrases in the intents database 278.

In order to generate a particular interpreted response, the NER component 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user and/or the device. For instance, a grammar model 276 associated with a shopping domain may include a database of words commonly used when people discuss shopping.

The intents identified by the IC component 264 are linked to domain-specific grammar frameworks (included in 276) with "slots" or "fields" to be filled. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER component 262 may parse the spoken utterance to identify words as subject, object, verb, preposition, etc., based on grammar rules and models, prior to recognizing named entities. The identified verb may be used by the IC component 264 to identify intent, which is then used by the NER component 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER component 262 then searches the corresponding fields in the domain-specific and personalized lexicon(s), attempting to match words and phrases in the utterance tagged as a grammatical object or object modifier with those identified in the database(s).

This process includes semantic tagging, which is the labeling of a word or combination of words according to their type/semantic meaning. Parsing may be performed using heuristic grammar rules, or the NER component 262 may be constructed using techniques such as HMMs, maximum entropy models, log linear models, conditional random fields (CRF), and the like.

For instance, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC component 264 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent are then used to determine what database fields should be searched to determine the meaning of these phrases, such as searching a user's gazette for similarity with the framework slots. So a framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER component 262 may search the database of generic words associated with the domain (i.e., in the NLU storage 273). For instance, if the utterance was "play songs by the rolling stones," after failing to determine an album name or song name called "songs" by "the rolling stones," the NER component 262 may search the domain vocabulary for the word "songs." In the alternative, generic words may be checked before the gazetteer information, or both may be tried, potentially producing two different results.

The comparison process used by the NER component 262 may classify (i.e., score) how closely a database entry compares to a tagged utterance word or phrase, how closely the grammatical structure of the utterance corresponds to the applied grammatical framework, and based on whether the database indicates a relationship between an entry and information identified to fill other slots of the framework.

The NER component 262 may also use contextual operational rules to fill slots. For example, if a user had previously requested to pause a particular song and thereafter requested that the speech-controlled device 110 "please un-pause my music," the NER component 262 may apply an inference-based rule to fill a slot associated with the name of the song that the user currently wishes to play—namely the song that was playing at the time the user requested to pause the music.

The results of NLU processing may be tagged to attribute meaning to the utterance. So, for example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the ASR component 250 may be sent to a user recognition component 802. The user recognition component 802 performs user recognition using the audio data 111, and optionally the ASR component output. The user recognition component 802 may include a scoring component that determines respective scores indicating whether the input utterance in the audio data 111 was spoken by particular users. The user recognition component 802 may also include a confidence component that determines an overall confidence as the accuracy of user recognition operations.

The output from the NLU processing, which may include tagged text data, commands, etc., and output of the user recognition component 802 (e.g., user recognition confidence data) may then be sent to a command processor 290, which may be located on a same or separate server 120 as part of the system 100. The system 100 may include more than one command processor 290, and the command processor 290 may be determined based on the NLU output. For example, if the NLU output includes a command to play music, the command processor 290 selected may correspond to a music playing application, such as one located on the speech-controlled device 110 or in a music playing appliance, configured to execute a music playing command. Many such command processors 290 may be available to the system depending on the various applications that may be invoked. If the NLU output includes a search utterance (e.g., requesting the return of search results), the command processor 290 selected may include a search engine processor, such as one located on a search server, configured to execute a search command and determine search results, which may include output text data to be processed by a TTS engine and output from a device as synthesized speech.

Figure 3:
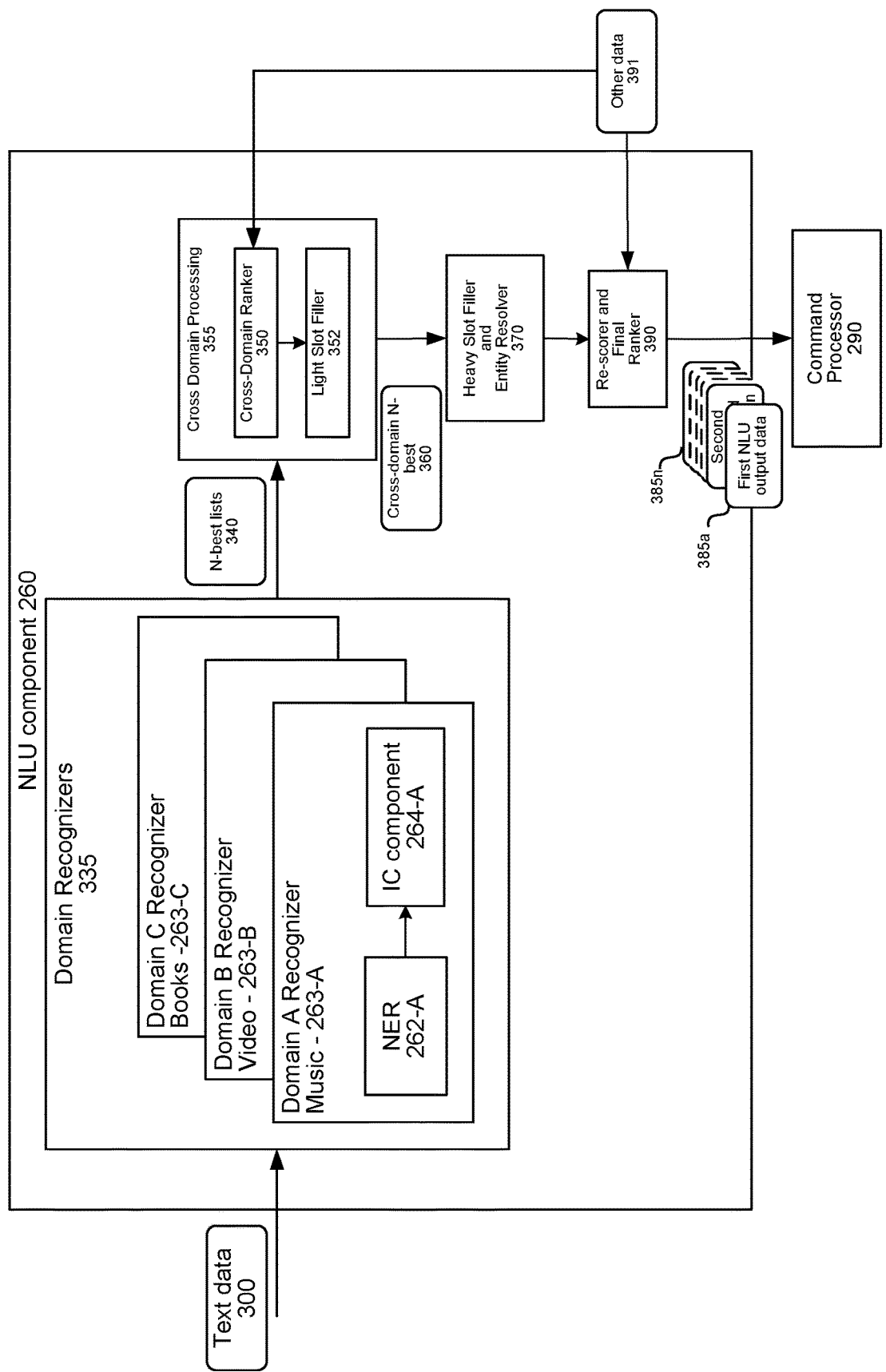
FIG. 3 is a conceptual diagram of a system architecture for parsing incoming utterances using multiple domains according to embodiments of the present disclosure.

The NLU operations of the system 100 may take the form of a multi-domain architecture, such as that illustrated in FIG. 3. In the illustrated architecture, each domain (which may include a set of intents and entity slots that define a larger concept such as music, books etc. as well as components such as trained models, etc. used to perform various NLU operations such as NER, IC, or the like) may be constructed separately and made available to the NLU component 260 during runtime operations where NLU operations are performed on text (such as text output from the ASR component 250). Each domain may have specially configured components to perform various steps of the NLU operations.

For example, the system 100 may include a multi-domain architecture consisting of multiple domains for intents/commands executable by the system 100 (or by other devices connected to the system 100), such as music, video, books, and information. The system 100 may include a plurality of domain recognizers 335, where each domain may include its own recognizer 263. Each recognizer may include various NLU components such as an NER component 262, IC component 264 and other components such as an entity resolver, or other components.

For example, a music domain recognizer 263-A (Domain A) may have an NER component 262-A that identifies what slots (i.e., portions of input text data 300) may correspond to particular words relevant to that domain. The words may correspond to entities such as (for the music domain) a performer, album name, song name, etc. An NER component 262 may use a machine learning model, such as a domain specific conditional random field (CRF) to both identify the portions corresponding to an entity as well as identify what type of entity corresponds to the text data portion. For example, for the text "play songs by the stones," an NER 262-A trained for a music domain may recognize the portion of text [the stones] corresponds to an entity and an artist name. The music domain recognizer 263-A may also have its own intent classification (IC) component 264-A that determines the intent of the text assuming that the text is within the proscribed domain. An IC component 264 may use a model, such as a domain specific maximum entropy classifier to identify the intent of the text, where the intent is the action the user desires the system 100 to perform.

As illustrated in FIG. 3, multiple domains may operate substantially in parallel, with different domain specific components. That is, domain B for video may have its own recognizer 263-B including NER component 262-B, and IC component 264-B. Domain C for books may also have similar components in its recognizer 263-C, and so on for the different domains available to the system. When input text data 300 (e.g., ASR output text data) is received, the same text data that is input into the NLU pipeline for domain A 263-A may also be input into the NLU pipeline for domain B 263-B, where the components for domain B 263-B will operate on the text data as if the text data related to domain B, and so on for the different NLU pipelines for the different domains. Each domain specific NLU pipeline will create its own domain specific NLU results, for example NLU results A (for domain A), NLU results B (for domain B), NLU results C (for domain C), and so on. The different NLU results may then be ranked and further processed using other downstream components as explained below.

As shown in FIG. 3, an NER component 262 and IC component 264 may be considered part of a recognizer (such as recognizer 263-A, 263-B, 263-C, etc.). The recognizers may operate using machine learning trained models such as a CRF, maximum entropy classifier, neural network (such as a deep neural network (DNN) or recurrent neural network (RNN)), or other classifier. The recognizers 335 may also use rules that operate on input query text data in a particular form to identify named entities and/or intents. The recognizers 335 may also operate using a data structure such as a finite state transducer (FST) to process the query text data to perform NER and/or IC. Other techniques or models may also be used to perform NER and/or IC. The techniques may also be used together. For example, a set of rules, an FST, and a trained machine learning model may all operate on input text data substantially in parallel to determine the named entities/intents of an input utterance. If one technique performs its task with high enough confidence, the system 100 may use the output of that technique over the others. The system 100 may also prioritize the results of different techniques in certain circumstances (for example rules results may be higher priority than FST results, which may be higher priority than model results, or some other configuration). Each recognizer (such as 263-A, 263-B, 263-C, etc.) may have its own rules, FSTs, and/or models operating such that each recognizer operates substantially in parallel to the other recognizers to come up with its own interpretation of the input text data.

The output of each recognizer 335 is a N-best list 340 of intents and identified slots representing the particular recognizer's top choices as to the meaning of the input text data, along with scores for each item in the N-best list 340. For example, for input text data 300 of "play poker face by lady gaga," the music domain recognizer 263-A may output an N-best list 340 in the form of:

[0.95] PlayMusicIntent ArtistName: Lady Gaga SongName: Poker Face

[0.02] PlayMusicIntent ArtistName: Lady Gaga

[0.01] PlayMusicIntent ArtistName: Lady Gaga AlbumName: Poker Face

[0.01] PlayMusicIntent SongName: Pokerface where the NER component 262-A of the recognizer 263-A has determined that for different items in the N-best list 340, the words "poker face" correspond to a slot and the words "lady gaga" correspond to a slot. (Though different items in the N-best list 340 interpret those slots differently, for example labeling "poker face" as a song name in one choice but labeling it as an album name in another.) The IC component 264-A of the recognizer 263-A has also determined that the intent of the input text data 300 is a PlayMusicIntent (and selected that as the intent for each item on the music N-best list 340). The recognizer 263-A also determined a score for each item on the list representing the recognizer's confidence that the particular item is correct. As can be seen in the example, the top item has the highest score. Each recognizer of the recognizers 335 may operate on the input text data 300 substantially in parallel, resulting in a number of different N-best lists 340, one for each domain (e.g., one N-best 340 list for music, one N-best list 340 for video, etc.). The size of any particular N-best list 340 output from a particular recognizer is configurable and may be different across domains.

While the recognizers 335 perform NER, that is they may identify words of the input text data 300 that are important for downstream processing (sometimes called light slot filling), and may even label those words according to type (such as artist name, album name, city, or the like), the recognizers 335 may not perform entity resolution (i.e., determining the actual entity corresponding to the words of the input text data 300). Entity resolution is typically a higher latency process and involves communications with a knowledge base 272 or other component to precisely identify the specific entities. As this process is resource intensive, it may be preferable to not perform this task for each item of every N-best list 340 across the multiple domains as some items have low scores and are unlikely to be used and any resources spent performing entity resolution would be wasted on low scoring items. Thus, a filtering of potential results may first be performed before engaging in more resource intensive processing. To that end, the cumulative N-best lists 340 may be passed to a cross domain processing component 355 which may then further rank the individual items on the N-best lists 340 as well as perform other operations.

The cross domain processing component 355 may include a cross-domain ranker 350. The cross-domain ranker 350 takes the group of N-best lists 340 and selects from among the lists 340 the top choices to create a new N-best list 360 that may include items from different domains, but only includes the highest scoring ones of those domains. The purpose of the cross-domain ranker 350 is to create a new list of top scoring potential results, so that downstream (more resource intensive) processes may only operate on the top choices.

As an example of a multi-domain N-best list 360 created by the cross-domain ranker 350, take the example input text data 300 of "play the hunger games." The text data 300 may be processed by each of the recognizers 335, and each will output an N-best list 340, resulting in a group of N-best lists 340 input into the cross domain processing component 355. The cross-domain ranker 350 may then rank the individual items among the N-best lists 340 to create a new N-best list 360. For example, the cross-domain ranker 350 may output an N-best list 360 in the form of:

[0.78] Video PlayVideoIntent VideoName: The Hunger Games

[0.13] Books ReadBookIntent BookName: The Hunger Games

[0.07] Music PlayMusicIntent AlbumName: Hunger Games where the top items from different N-best lists 340 from multiple domains are grouped into a single N-best list 360. As shown, the top scoring item is from the video domain 263-B, which includes the intent "playvideointent" and a slot labeled as video name corresponding to the text "the hunger games." The next item is from the books domain 263-C, and includes the intent "readbookintent" and a slot labeled as book name corresponding to the text "the hunger games." Each item in the N-best list 360 may also include a score. The size of the cross domain N-best list 360 is configurable.

While the cross-domain ranker 350 takes as input the N-best lists 340, it may also consider other information, such as other data 391.

The cross domain processing component 355 may also include a light slot filler component 352. The light slot filler 352 can take information from slots and alter it to make the data more easily processed by downstream components The operations of the light slot filler 352 are typically low latency operations that do not involve heavy operations such as reference to a knowledge base. The purpose of the light slot filler 352 is to replace words with other words or values that may be more easily understood by downstream components. For example, if input text data 300 included the word "tomorrow", the light slot filler 352 may replace the word "tomorrow" with an actual date for purposes of downstream processing. Similarly, a word "CD" may be replaced by a word "album." The replaced words are then included in the cross domain N-best list 360.

The N-best list 360 is then output to a heavy slot filler and entity resolution component 370. The heavy slot filler and entity resolver 370 can apply rules or other instructions to standardize labels or tokens from previous stages into an intent/slot representation. The precise transformation may depend on the domain (for example, for a travel domain a text mention of "Boston airport" may be transformed to the standard BOS three-letter code referring to the airport). The resolver 370 can refer to an authority source (such as a knowledge base 272) that is used to specifically identify the precise entity referred to in the entity mention identified in the incoming text. Specific intent/slot combinations may also be tied to a particular source, which may then be used to resolve the text (such as by providing information or a command to be executed in response to a user query). For example, in the example "play songs by the stones," the resolver 370 may reference to a personal music catalog, Amazon Music account, user profile (discussed in detail below), or the like. The output from the entity resolution component 370 may include an altered N-best list that is based on the cross-domain N-best list 360 but also includes more detailed information about the specific entities mentioned in the text data 300 (such as specific entity IDs) and/or more detailed slot data that can eventually be used by a command processor 290 which may be incorporated into the same system components or pipeline or may be on a separate device in communication with the system 100. While illustrated as a cross-domain resolver, multiple resolution components 370 may exist where a particular resolution component 370 may be specific for one or more domains.

As can be appreciated, the entity resolver 370 may not necessarily be successful in resolving every entity and filling every slot. This may result in incomplete results in the combined N-best list 360. A re-scorer and final ranker component 390 may consider such errors when determining how to rank the ultimate results for potential execution. For example, if an item of the N-best list 360 comes from a book domain and includes a read book intent, but the entity resolver 370 cannot find a book with a title matching the input text data 300, that particular result may be re-scored by the final ranker 390 to be given a lower score. Each item considered by the final ranker 390 may also be assigned a particular confidence, where the confidence may be determined by a recognizer 335, cross domain processor 355, or by the final ranker 390 itself. Those confidence scores may be used to determine how to rank the individual NLU results represented in the N-best lists 340. The confidence scores may be affected by unfilled slots. For example, if one domain is capable of filling a slot (i.e., resolving the word in the slot to an entity or other recognizable form) for an input query, the results from that domain may have a higher confidence than those from a different domain that is not capable of filling a slot.

The final ranker 390 may be configured to apply re-scoring, biasing, or other techniques to obtain the most preferred ultimate result. To do so, the final ranker 390 may consider not only the NLU results of the N-best lists 340, but may also consider other data 391. This other data 391 may include a variety of information. For example, the other data 391 may include application rating or popularity. For example, if one application has a particularly high rating, the system 100 may increase the score of results associated with that particular application. The other data 391 may also include information about applications that have been specifically enabled by the user (as indicated in a user profile as discussed in detail below). NLU results from enabled applications may be scored higher than results from non-enabled applications. User history may also be considered, such as if the user regularly uses a particular supplemental application or does so at particular times of day. Date, time, location, weather, type of device 110, customer ID, context, and other information may also be considered. For example, the system 100 may consider when any particular applications are currently active (such as music being played, a game being played, etc.) between the system 100 and device 110. The highest scoring result (or results in the case of multiple commands being in an utterance) may be passed to a downstream command processor 290 for execution.

Following final ranking, the NLU component 260 may output NLU output data 385. The NLU output data 385 may include an indicator of the command to be executed along with data associated with the command, for example an indication that the command is "play music" and the music to be played is "Adele." The NLU output data 385 may be in the form of previous NLU data such as item(s) in N-best list 340, item(s) in cross-domain N-best list 360, or the like. The NLU output data 385 may also be in a format executable by the command processor 290. Multiple instances of NLU output data (e.g., 385a-385n) may be output.

Figure 4:
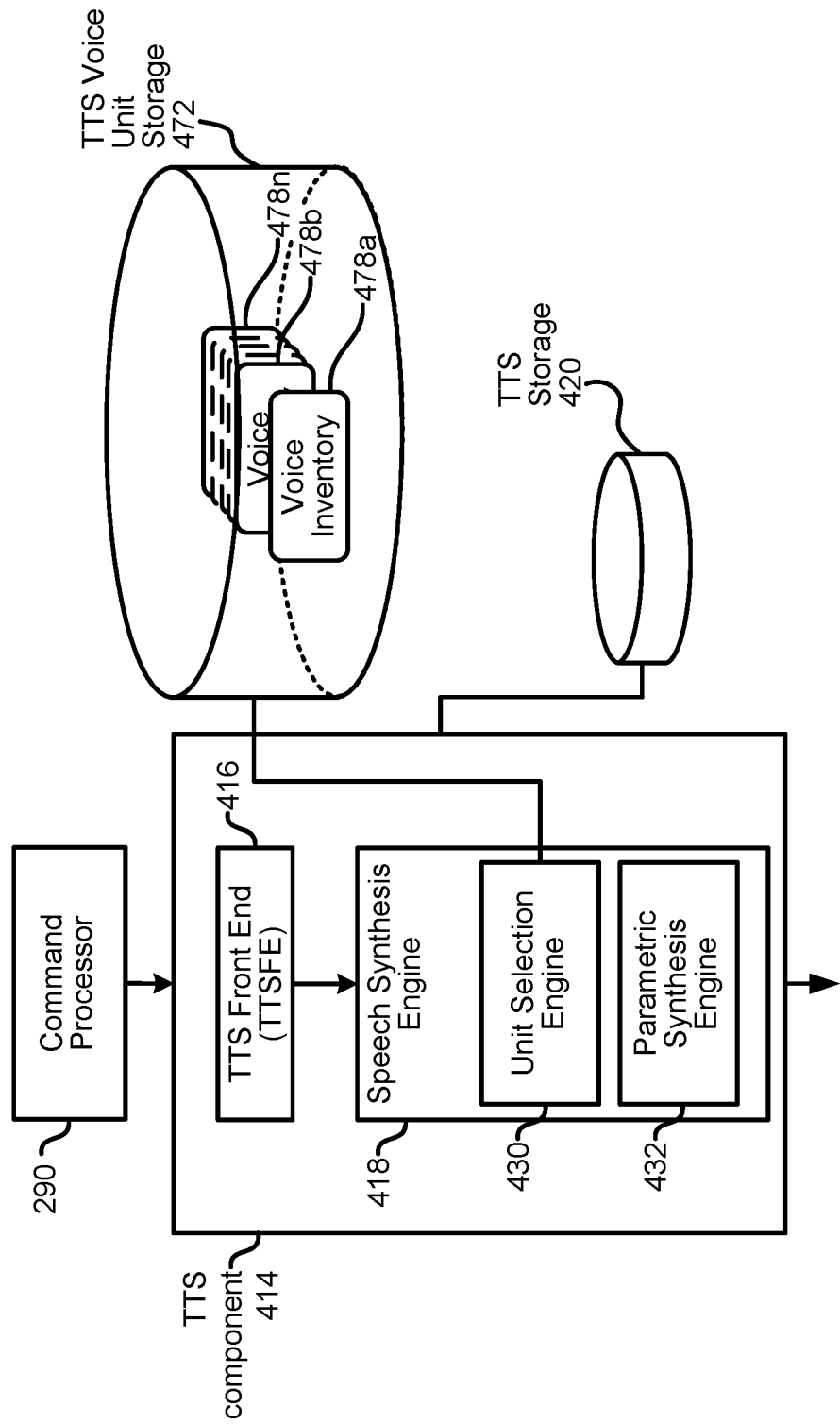
FIG. 4 is a conceptual diagram of how text-to-speech processing is performed according to embodiments of the present disclosure.

A TTS component 414 may receive tagged text data from the command processor 290, so the TTS component 414 may synthesize speech corresponding to the text data. Speech may be synthesized by the TTS component 414 as described below with respect to FIG. 4.

The TTS component 414 includes a TTS front end (TTSFE) 416, a speech synthesis engine 418, and a TTS storage 420. The TTSFE 416 transforms input text data (e.g., from the command processor 290) into a symbolic linguistic representation for processing by the speech synthesis engine 418. The TTSFE 416 may also process tags or other data input to the TTS component 414 that indicate how specific words should be pronounced. The speech synthesis engine 418 compares the annotated phonetic units and information stored in the TTS storage 420 for converting the input text data into speech (i.e., audio data). The TTSFE 416 and the speech synthesis engine 418 may include their own controller(s)/processor(s) and memory, or they may use the controller/processor and memory of the server 120, the speech-controlled device 110, or another device, for example. Similarly, the instructions for operating the TTSFE 416 and the speech synthesis engine 418 may be located within the TTS component 414, within the memory and/or storage of the server 120, the speech-controlled device 110, or within an external device.

Text data input into the TTS component 414 may be sent to the TTSFE 416 for processing. The TTSFE 416 may include components for performing text normalization, linguistic analysis, and linguistic prosody generation. During text normalization, the TTSFE 416 processes the input text data and generates standard/normalized text data, converting such things as numbers, abbreviations (e.g., Apt., St., etc.), and symbols ($, %, etc.) into the equivalent of written out words.

During linguistic analysis, the TTSFE 416 analyzes language in the normalized text data to generate a sequence of phonetic units corresponding to the text data. This process may be referred to as phonetic transcription. Phonetic units include symbolic representations of sound units to be eventually combined and output by the system 100 as speech. Various sound units may be used for dividing text data for purposes of speech synthesis. The TTS component 414 may process speech based on phonemes (i.e., individual sounds), half-phonemes, di-phones (i.e., the last half of one phoneme coupled with the first half of an adjacent phoneme), bi-phones (i.e., two consecutive phonemes), syllables, words, phrases, sentences, or other units. Each word may be mapped to one or more phonetic units. Such mapping may be performed using a language dictionary stored by the system 100, for example in the TTS storage 420. The linguistic analysis performed by the TTSFE 416 may also identify different grammatical components such as prefixes, suffixes, phrases, punctuation, syntactic boundaries, or the like. Such grammatical components may be used by the TTS component 414 to craft a natural sounding audio waveform output. The language dictionary may also include letter-to-sound rules and other tools that may be used to pronounce previously unidentified words or letter combinations that may be encountered by the TTS component 414. Generally, the more information included in the language dictionary, the higher quality the speech output.

Based on the linguistic analysis, the TTSFE 416 may then perform linguistic prosody generation where the phonetic units are annotated with desired prosodic characteristics, also called acoustic features, which indicate how the desired phonetic units are to be pronounced in the eventual output speech. During this stage, the TTSFE 416 may consider and incorporate any prosodic annotations that accompanied the text data input to the TTS component 414. Such acoustic features may include pitch, energy, duration, and the like. Application of acoustic features may be based on prosodic models available to the TTS component 414. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information.

The output of the TTSFE 416, referred to as a symbolic linguistic representation, may include a sequence of phonetic units annotated with prosodic characteristics. This symbolic linguistic representation may be sent to the speech synthesis engine 418, also known as a synthesizer, for conversion into an audio waveform of speech for output to an audio output device and eventually to a user. The speech synthesis engine 418 may be configured to convert the input text data into high-quality natural-sounding speech in an efficient manner. Such high-quality speech may be configured to sound as much like a human speaker as possible, or may be configured to be understandable to a listener without attempts to mimic a precise human voice.

The speech synthesis engine 418 may perform speech synthesis using one or more different methods. In one method of synthesis called unit selection, a unit selection engine 430 matches the symbolic linguistic representation created by the TTSFE 416 against a database of recorded speech, such as a database of a voice corpus (e.g., the TTS voice unit storage 472). The unit selection engine 430 matches the symbolic linguistic representation against spoken audio units in the database. Matching units are selected and concatenated together to form a speech output. Each unit includes an audio waveform corresponding with a phonetic unit, such as a short .wav file of the specific sound, along with a description of the various acoustic features associated with the .wav file (e.g., its pitch, energy, etc.), as well as other information, such as where the phonetic unit appears in a word, sentence, or phrase, neighboring phonetic units, etc. Using all the information in the unit database, the unit selection engine 430 may match units to the input text data to create a natural sounding waveform. The unit database may include multiple examples of phonetic units to provide the system 100 with many different options for concatenating units into speech. One benefit of unit selection is that, depending on the size of the database, a natural sounding speech output may be generated. As described above, the larger the unit database of the voice corpus, the more likely the system 100 will be able to construct natural sounding speech.

In another method of synthesis, called parametric synthesis, parameters such as frequency, volume, and noise are varied by a parametric synthesis engine 432, a digital signal processor, or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Parametric synthesis may include the ability to be accurate at high processing speeds, as well as the ability to process speech without large databases associated with unit selection, but also typically produces an output speech quality that may not match that of unit selection. Unit selection and parametric techniques may be performed individually or combined together and/or combined with other synthesis techniques to produce speech audio data output.

Parametric speech synthesis may be performed as follows. The TTS component 414 may include an acoustic model, or other models, which may convert a symbolic linguistic representation into a synthetic acoustic waveform of the input text data based on audio signal manipulation. The acoustic model includes rules which may be used by the parametric synthesis engine 432 to assign specific audio waveform parameters to input phonetic units and/or prosodic annotations. The rules may be used to calculate a score representing a likelihood that a particular audio output parameter(s) (e.g., frequency, volume, etc.) corresponds to the portion of the input symbolic linguistic representation received from the TTSFE 416.

The parametric synthesis engine 432 may use a number of techniques to match speech to be synthesized with input phonetic units and/or prosodic annotations. One common technique is using HMMs. HMMs may be used to determine probabilities that audio output should match textual input. HMMs may be used to translate from parameters from the linguistic and acoustic space to parameters to be used by a vocoder (i.e., the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text data. Each portion of text data may be represented by multiple potential states corresponding to different known pronunciations of phonemes and their parts (e.g., phoneme identity, stress, accent, position, etc.). An initial determination of a probability of a potential phoneme may be associated with one state. As new text data is processed by the speech synthesis engine 418, the state may change or stay the same, based on processing of the new text data. For example, the pronunciation of a previously processed word might change based on later processed words. A Viterbi algorithm may be used to find the most likely sequence of states based on the processed text data. The HMMs may generate speech in parametrized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, harmonic plus noise (HNM) based vocoders, code-excited linear prediction (CELP) vocoders, GlottHMM vocoders, harmonic/stochastic model (HSM) vocoders, or others.

For example, to create the customized speech output of the system 100, the system 100 may be configured with multiple voice inventories 478 (stored in the TTS voice unit storage 472), where each unit database is configured with a different "voice." Such voice inventories may also be linked to user accounts, discussed below. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual and recorded by the system 100. The TTS training utterances used to train a TTS voice corpus may be different from the training utterances used to train an ASR system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus, the audio data of each customized voice corpus may match a desired speech quality. The customized voice inventory 478 may then be used during runtime to perform unit selection to synthesize speech.

As an alternative to customized voice corpuses or customized parametric "voices," one or more filters may be used to alter traditional TTS output to match a desired speech quality (e.g., whisper, shout, etc.). For example, the TTS component 414 may synthesize speech as normal, but the system 100, either as part of the TTS component 414 or otherwise, may apply a filter to make the synthesized speech take on the desired speech quality. In this manner a traditional TTS output may be altered to take on the desired speech quality.

During runtime the TTS component 414 may receive text data for speech synthesis along with an indicator for a desired speech quality of the output speech. The TTS component 414 may then select a voice matching the speech quality, either for unit selection or parametric synthesis, and synthesize speech using the received text data and speech quality indicator.

Figure 5:
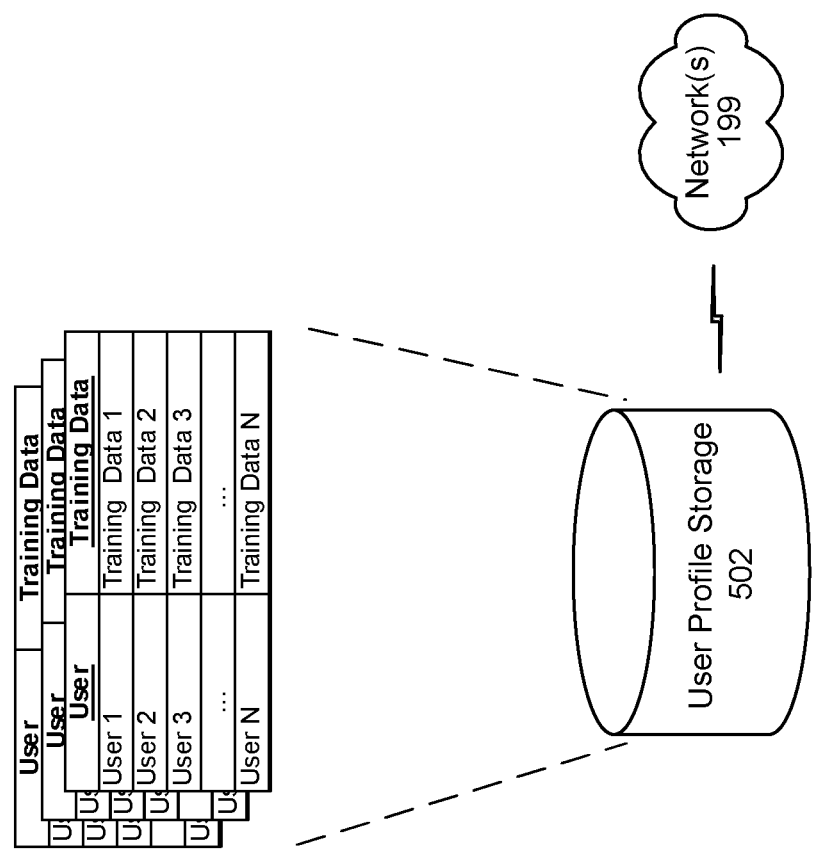
FIG. 5 illustrates data stored and associated with user profiles according to embodiments of the present disclosure.

FIG. 5 illustrates a user profile storage 502 that includes data regarding users of a device. The user profile storage 502 may be located proximate to the server(s) 120, or may otherwise be in communication with various components of the system 100, for example over the network 199. The user profile storage 502 may include a variety of information related to individual users, accounts, etc. that interact with the system 100. In an example, the user profile storage 502 is a cloud-based storage. For illustration, as shown in FIG. 5, the user profile storage 502 may include data regarding multiple users of a single speech-controlled device 110 (or other device). Each user indicated in a user profile associated with a speech-controlled device 110 may be associated with training data corresponding to training spoken utterances of the respective user, such as training data 805 discussed below. In addition or alternatively, each user indicated in the user profile associated with a speech-controlled device 110 may be associated with feature/vector data corresponding to training data of the respective user. Further, each user may have a user ID that identifies the specific user for further system processing.

Figure 6:
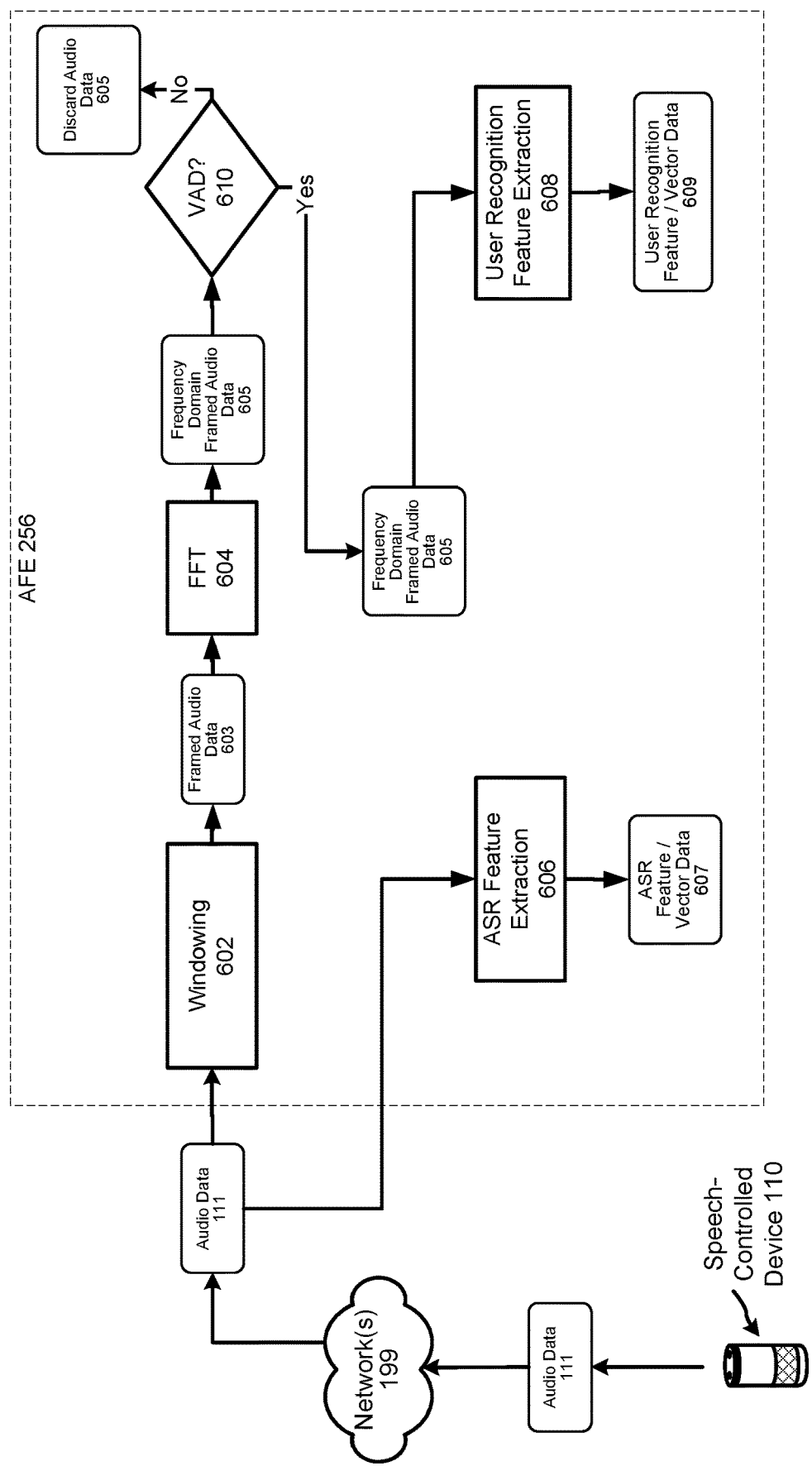
FIG. 6 is a flow diagram illustrating processing performed to prepare audio data for ASR and user verification according to embodiments of the present disclosure.

FIG. 6 illustrates processing performed to prepare audio data for ASR and user recognition. The speech-controlled device 110 sends audio data 111 through a network(s) 199 to the server(s) 120 for processing. The server(s) 120 may include an acoustic front end (AFE) 256 (or other component(s)) that performs various functions on the incoming audio data 111 to prepare the incoming audio data 111 for further downstream processing, such as ASR and/or user recognition. For example, the AFE 256 may perform (602) windowing functions on the audio data 111 to create framed audio data 603 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 256 may then perform (604) a fast Fourier transform (FFT) that converts the waveforms in each frame of the framed audio data 603 from its original domain (e.g., time) to a representation in a frequency domain (thereby creating frequency domain framed audio data 605). Audio processing techniques other than or in addition to FFT may be used to transform audio data (e.g., waveforms) into data that can be processed as needed.

The server(s) 120 (through the AFE 256 or using another component) then detects (610) whether voice activity (i.e., speech) is present in the post-FFT waveforms (i.e., frequency domain framed audio data 605). In doing so the server(s) 120 may perform VAD operations discussed above. The VAD detector 610 (or other components) may also be configured in a different order, for example the VAD detector 610 may operate on input audio data 111 rather than on frequency domain framed audio data 605, may operate on ASR features, etc. Various different configurations of components are possible. If there is no speech in the audio data, the server(s) 120 discards the frequency domain framed audio data 605 (i.e., removes the audio data from the processing stream). If, instead, the server(s) 120 detects speech in the frequency domain framed audio data 605, the server(s) 120, performs user recognition feature extraction (608) on the frequency domain framed audio data 605. User recognition feature extraction (608) may include performing frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature/vector data 609). The feature extraction may continue until voice activity is no longer detected in the input audio data, at which point the server(s) 120 may determine that an endpoint of the speech has been reached processing with respect thereto. ASR feature extraction (606) may be performed on all the audio data 111 received from the speech-controlled device 110. Alternatively (not illustrated), ASR feature extraction (606) may only be performed on audio data including speech (as indicated by the VAD 610). ASR feature extraction (606) and user recognition feature extraction (608) involve determining values (i.e., features) representing qualities of the frequency domain framed audio data 605, along with quantitating those features into values (i.e., feature vectors or audio feature vectors). ASR feature extraction (606) may determine ASR feature/vector data 607 useful for ASR processing, and user recognition feature extraction (608) may determine user recognition feature/vector data 609 useful for user recognition. The ASR feature/vector data 607 and the user recognition feature/vector data 609 may be the same features/vectors, different features/vectors, or may include some overlapping features/vectors. A number of approaches may be used to extract features/vectors from the frequency domain framed audio data 605, such as MFCCs, PLP techniques, neural network feature vector techniques, linear discriminant analysis, semi-tied covariance matrices, or other approaches known to those skilled in the art.

Typically, the ASR feature/vector data 607 may include a different audio feature vector for each audio frame. Thus, for one 25 ms long audio frame, the ASR feature extraction component 606 may output a single ASR feature vector. The ASR feature vectors 607 output by the ASR feature extraction component 606 may be output to an ASR component 250 to perform speech recognition.

Depending on system configuration, the user recognition feature extraction component 608 may output multiple user recognition feature vectors, for example one such vector for each audio frame. Alternatively, the user recognition feature extraction component 608 may continue to input the frequency domain framed audio data 605 while the utterance is ongoing (e.g., before the endpoint of the speech is reached in the audio data 605). While the audio data 605 for the utterance is input, the user recognition feature extraction component 608 may accumulate or otherwise combine the audio data 605 as it comes in. That is, for a certain frame's worth of audio data 605 that comes in, the user recognition feature extraction component 608 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 608 may depend on what audio qualities are determined to be important for ultimate user recognition. Thus, the user recognition feature extraction component 608 may be trained to isolate and process data that is most useful for user recognition. The output of the user recognition feature extraction component 608 may thus include user recognition feature/vector data 609 that includes values for features useful for user recognition. The resulting user recognition feature/vector data 609 may then be used for user recognition.

Figure 7:
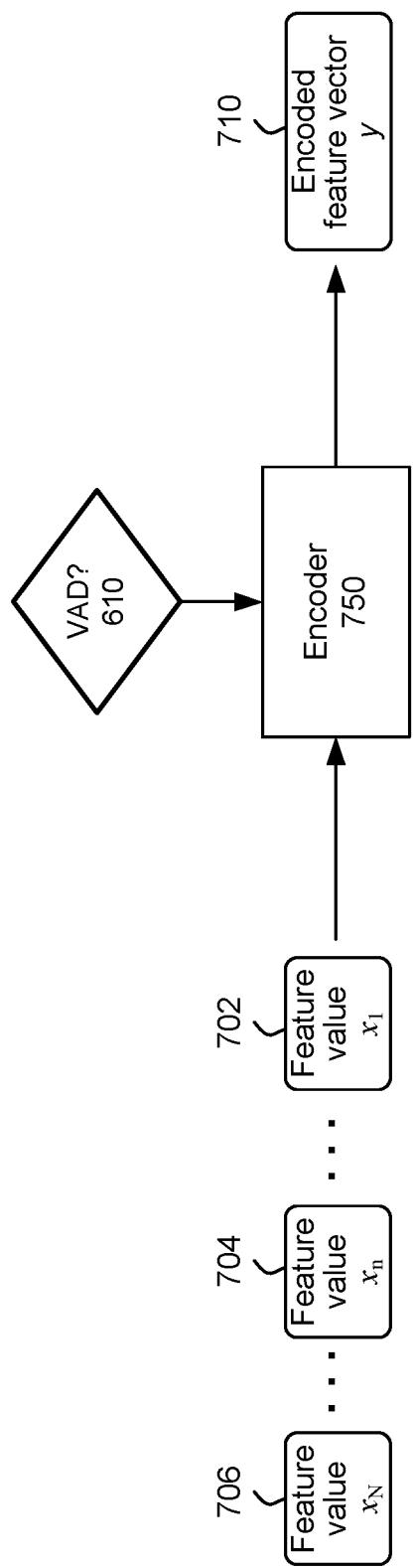
FIG. 7 is a diagram of a vector encoder according to embodiments of the present disclosure.

The user recognition feature/vector data 609 may include multiple vectors each corresponding to different portions of the input utterance. Alternatively, the user recognition feature/vector data 609 may be a single vector representing audio qualities of the input utterance. Referring to FIG. 7, the single vector may be created using an encoder 750 which can create a fixed-size vector to represent certain characteristics of the audio data entities as described below. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on use of the encoded vector and other system configurations.

As shown in FIG. 7, feature values 702 through 706 (which may include feature vectors of audio data 111, frequency domain framed audio data 605, or the like) may be input into an encoder 750 which will output an encoded feature vector 710 that represents the input feature values. The VAD 610 may be an input into the encoder 750 such that the encoder 750 may only operate when feature values input therein correspond to speech. The individual feature values (e.g., 702-706) may correspond to specific audio frames. Regardless of how many feature values are input, any particular encoder 750 will be configured to output vectors of the same size, thus ensuring a continuity of output encoded vector size from any particular encoder 750 (though different encoders may output vectors of different fixed sizes) and enabling comparing different feature vectors y. The value y may be called an embedding of the sequence $x_1, \ldots x_N$. The length of x and y are fixed and known a-priori, but the length of N of feature sequence $x_1, \ldots x_N$ is not necessarily known a-priori. The encoder E may be implemented as a neural network (NN), recurrent neural network (RNN), GMM, or other model. One particular example is a long short-term memory (LSTM) RNN. There are a variety of ways for the encoder 750 to consume the encoder input, including but not limited to:

linear, one direction (forward or backward),
bi-linear, essentially the concatenation of a forward and a backward embedding, or
tree, based on parse-tree of the sequence.

In addition, an attention model can be used, which is another RNN or deep neural network (DNN) that learns to "attract" attention to certain parts of the input. The attention model can be used in combination with the above methods of consuming the input.

FIG. 7 illustrates operation of the encoder 750. The input feature value sequence, starting with feature value $x_1$ 702, continuing through feature value $x_n$ 704 and concluding with feature value $x_N$ 706 is input into the encoder 750. The encoder 750 may process the input feature values as noted above. The encoder 750 outputs the encoded feature vector y 710, which is a fixed length feature vector of length F. Thus, the user recognition feature extraction component 608 may include an encoder 750 that receives audio feature values for a particular utterance as input, and outputs a fixed length encoded feature vector y 710, which may be the user recognition feature/vector data 609. Thus, in certain system configurations, no matter how long the utterance is, or how many acoustic frames worth of feature values are input into the encoder 750, the output feature vector 710/609 will be of the same length, thus allowing for more ease of performing user recognition by the user recognition component 802. To allow for robust system operation a final vector 609 may include many dimensions (e.g., several hundred), thus providing many datapoints for downstream consideration.

To determine the user recognition feature/vector data 609, the system may (for example using VAD detector 610) determine that voice activity is detected in input audio. This may indicate the beginning of the utterance, thus resulting in the system determining that the input utterance starts at a first point in audio data. Audio processing (for example by windowing 602, FFT 604, ASR feature extraction 606, user recognition feature extraction 608, ASR component 250, or the like) may continue on the utterance audio data starting at the first point and continuing until the VAD detector 610 determines that voice activity is no detected at a second point in audio data. Thus, the system may determine that the input utterance ends at the second point. Thus, the first point may be considered the beginpoint of the utterance and the second point may be considered the endpoint of the utterance. The VAD detector 610, or other component, may signal the user recognition feature extraction component 608 when the beginpoint and/or endpoint is detected so that the user recognition feature extraction component 608 may begin processing audio data starting at the beginpoint and ending at the endpoint. Further, audio frames during the utterance that do not include speech may be filtered out by the VAD detector 610 and thus not considered by the ASR feature extraction 606 and/or user recognition feature extraction 608. The resulting accumulated/processed speech audio data for the utterance (from beginpoint to endpoint) may then be represented in a single feature vector for the user verification feature/vector data 609, which may then be used for user recognition.

Figure 8:
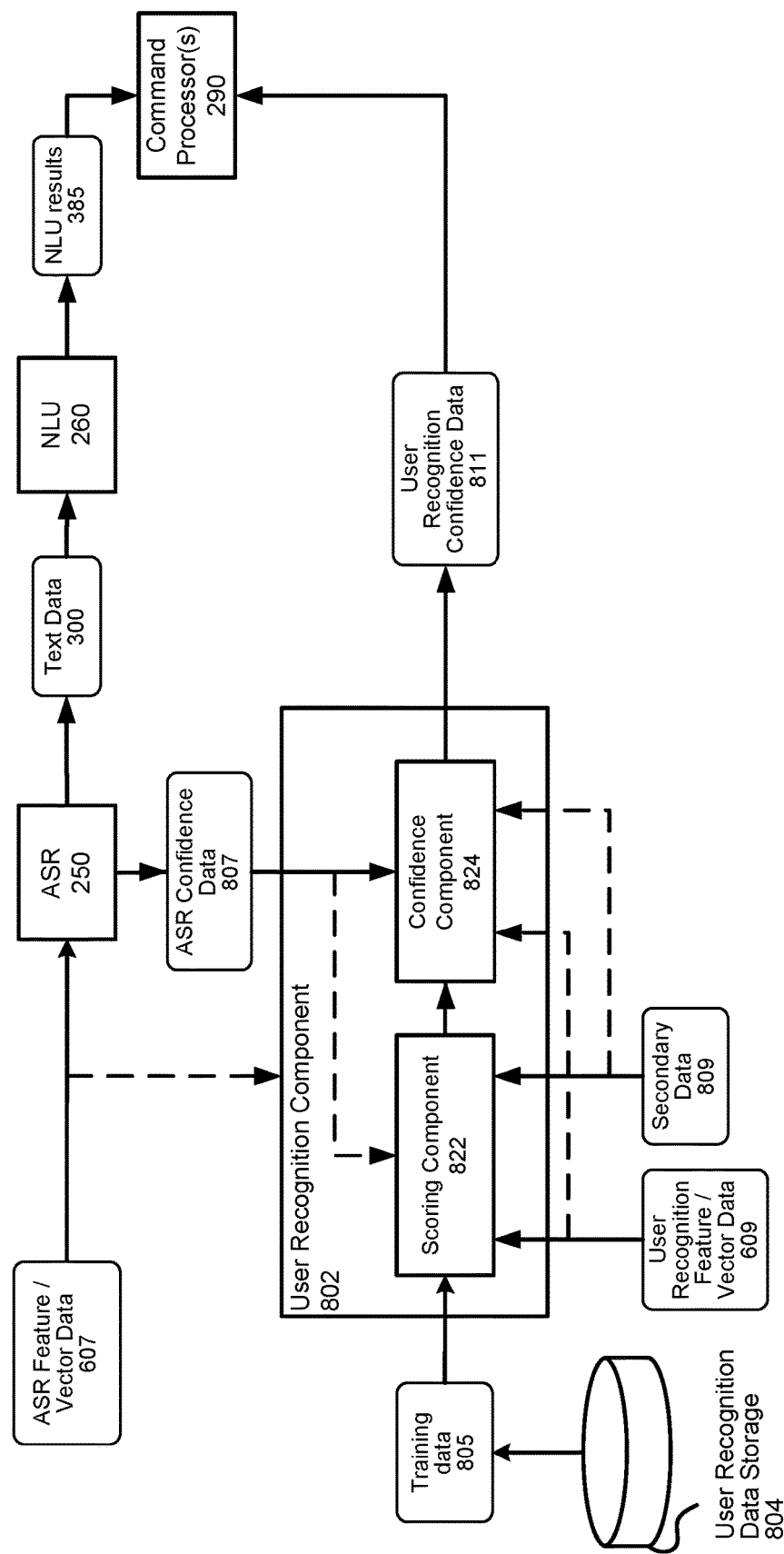
FIG. 8 is a system flow diagram illustrating user verification according to embodiments of the present disclosure.

FIG. 8 illustrates user recognition as performed by the server(s) 120. The ASR component 250 performs ASR on the ASR feature/vector data 607 as described above. ASR output (i.e., text data 300) is then processed by the NLU component 260 as described above. The ASR confidence data 807 is then passed to a user recognition component 802.

The user recognition component 802 of the server(s) 120 performs user recognition using various data including the user recognition feature/vector data 609, training data 805 corresponding to sample audio data corresponding to known users, the ASR confidence data 807 and secondary data 809. The user recognition component 802 may then output user recognition confidence data 811 which reflects a certain confidence that the input utterance was spoken by one or more particular users. The user recognition confidence data 811 may include an indicator of the verified user (such as a user ID corresponding to the speaker of the utterance) along with a confidence value corresponding to the user ID, such as a numeric value or binned value as discussed below.

The training data 805 may be stored in a user recognition data storage 804. The user recognition data storage 804 may be stored by the server(s) 120, or may be a separate device. Further, the user recognition data storage 804 may be part of user profile storage 502. The user recognition data storage 804 may be a cloud-based storage. The training data 805 stored in the user recognition data storage 804 may be stored as waveforms and/or corresponding features/vectors. The training data 805 may correspond to data from various audio samples, each audio sample associated with a known user and/or user identity. For example, each user known to the system may be associated with some set of training data 805 for the known user. The user recognition component 802 may then use the training data 805 to compare against incoming audio data (represented by user recognition feature/vector data 609) to determine the identity of a user speaking an utterance. The training data 805 stored in the user recognition data storage 804 may thus be associated with multiple users of multiple devices. Thus, the training data 805 stored in the storage 804 may be associated with both a user that spoke the respective utterance, as well as the speech-controlled device 110 that captured the respective utterance.

The training data 805 for a particular user may include a feature vector of the same size as a vector of the user recognition feature/vector data 609. Thus, for example, if a feature vector 609 is of size F (for example encoded by encoder 750), the training data 805 may also be a feature vector of size F. To create such a training data feature vector, during a training period the system may either prompt a user to speak sample audio data or may identify sample audio data known to have been spoken by a particular user. The system may then process the sample audio data (for example into feature values such as 702-706 and then by encoder 750) to create sample training data 805 (e.g., a feature vector of size F). The training data 805 may then be stored by the system (such as in data storage 804) and saved for use during runtime user recognition processing.

To perform user recognition, the user recognition component 802 may determine the speech-controlled device 110 from which the audio data 111 originated. For example, the audio data 111 may include a tag indicating the speech-controlled device 110. Either the speech-controlled device 110 or the server(s) 120 may tag the audio data 111 as such. The tag indicating the speech-controlled device 110 may be associated with the user recognition feature/vector data 609 produced from the audio data 111. The user recognition component 802 may send a signal to the user recognition data storage 804, with the signal requesting only training data 805 associated with known users of the speech-controlled device 110 from which the audio data 111 originated. This may include accessing a user profile associated with the speech-controlled device 110 and then only inputting training data 805 associated with users corresponding to the user profile of the device 110. This limits the universe of possible training data the recognition component 802 should consider at runtime when recognizing a user and thus decreases the amount of time to perform user recognition by decreasing the amount of training data 805 needed to be processed. Alternatively, the user recognition component 802 may access all (or some other subset of) training data 805 available to the system. However, accessing all training data 805 will likely increase the amount of time needed to perform user recognition based on the magnitude of training data to be processed.

If the user recognition component 802 receives training data 805 as an audio waveform, the user recognition component 802 may determine features/vectors of the waveform(s) or otherwise convert the waveform into a data format that can be used by the user recognition component 802 to actually perform the user recognition. The user recognition component 802 may then identify the user that spoke the utterance in the audio data 111 by comparing features/vectors of the user recognition feature/vector data 609 to training features/vectors (either received from the storage 804 or determined from training data 805 received from the storage 804).

The user recognition component 802 may include a scoring component 822 which determines respective scores indicating whether the input utterance (represented by user verification feature/vector data 609) was spoken by particular users (represented by training data 805). The user recognition component 802 may also include a confidence component 824 which determines an overall confidence as the accuracy of the user recognition operations (such as those of the scoring component 822) and/or an individual confidence for each user potentially identified by the scoring component 822. The output from the scoring component 822 may include scores for all users with respect to which user recognition was performed (e.g., all users associated with the speech-controlled device 110). For example, the output may include a first score for a first user, a second score for a second user, and third score for a third user, etc. Although illustrated as two separate components, the scoring component 822 and confidence component 824 may be combined into a single component or may be separated into more than two components.

The scoring component 822 and confidence component 824 may implement one or more trained machine learning models (such neural networks, classifiers, etc.) as known in the art. For example, the scoring component 822 may use probabilistic linear discriminant analysis (PLDA) techniques. PLDA scoring determines how likely it is that the input user recognition feature vector 609 corresponds to a particular training data feature vector 805 for a particular user. The PLDA scoring may generate similarity scores for each training feature vector considered and may output the list of scores and users and/or the user ID of the speaker whose training data feature vector most closely corresponds to the input user recognition feature vector 609 of the utterance. The scoring component 822 may also use other techniques such as GMMs, generative Bayesian models, or the like, to determine similarity scores.

The confidence component 824 may input various data including information about the ASR confidence 807, utterance length (e.g., number of frames or time of the utterance), audio condition/quality data (such as signal-to-interference data or other metric data), fingerprint data, image data, or other factors to consider how confident the user recognition component 802 is with regard to the scores linking users to the input utterance. The confidence component 824 may also consider the similarity scores and user IDs output by the scoring component 822. Thus, the confidence component 824 may determine that a lower ASR confidence 807, or poor input audio quality, or other factors, may result in a lower confidence of the user recognition component 802. Whereas a higher ASR confidence 807, or better input audio quality, or other factors, may result in a higher confidence of the user recognition component 802. Precise determination of the confidence may depend on configuration and training of the confidence component 824 and the models used therein. The confidence component 824 may operate using a number of different machine learning models/techniques such as GMM, neural networks, etc. For example, the confidence component 824 may be a classifier configured to map a score output by the scoring component 822 to a confidence.

The user recognition component 802 may output user recognition confidence data 811 specific to a single user, or multiple users in the form of an N-best list. For example, the user recognition component 802 may output user recognition confidence data 811 with respect to each user indicated in the profile associated with the speech-controlled device 110 from which the audio data 111 was received. The user recognition confidence data 811 may include particular scores (e.g., 0.0-1.0, 0-1000, or whatever scale the system is configured to operate). Thus the system may output an N-best list of potential users with confidence scores (e.g., John—0.2, Jane—0.8). Alternatively or in addition, the user recognition confidence data 811 may include binned recognition indicators. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." Thus, the system may output an N-best list of potential users with binned scores (e.g., John—low, Jane—high). Combined binned and confidence score outputs are also possible. Rather than a list of users and their respective scores and/or bins, the user recognition confidence data 811 may only include information related to the top scoring user as determined by the user recognition component 802. The scores and bins may be based on information determined by the confidence component 824. The user recognition component 802 may also output a confidence value that the scores/bins are correct, where the confidence value indicates how confident the user recognition component 802 is in the output results. This confidence value may be determined by the confidence component 824.

The confidence component 824 may determine individual user confidences and differences between user confidences when determining the user recognition confidence data 811. For example, if a difference between a first user's confidence score and a second user's confidence score is large, and the first user's confidence score is above a threshold, then the user recognition component 802 is able to recognize the first user as the user that spoke the utterance with a much higher confidence than if the difference between the users' confidences were smaller.

The user recognition component 802 may perform certain thresholding to avoid incorrect user recognition results being output. For example, the user recognition component 802 may compare a confidence score output by the confidence component 824 to a confidence threshold. If the confidence score is not above the confidence threshold (for example, a confidence of "medium" or higher), the user recognition component 802 may not output user recognition confidence data 811, or may only include in that data 811 an indication that a user speaking the utterance could not be verified. Further, the user recognition component 802 may not output user recognition confidence data 811 until enough user recognition feature/vector data 609 is accumulated and processed to verify the user above a threshold confidence. Thus the user recognition component 802 may wait until a sufficient threshold quantity of audio data of the utterance has been processed before outputting user recognition confidence data 811. The quantity of received audio data may also be considered by the confidence component 824.

The user recognition component 802 may be defaulted to output binned (e.g., low, medium, high) user recognition confidence data 811. However, such may be problematic from the command processor(s) 290 perspective. For example, if the user recognition component 802 computes a single binned confidence for multiple users, the command processor(s) 290 may not be able to determine which user to determine content with respect to. In this situation, the user recognition component 802 may be configured to override its default setting and output user recognition confidence data 811 including values (e.g., 0.0-1.0) associated with the users associated with the same binned confidence. This enables the command processor(s) 290 to select content associated with the user associated with the highest confidence value. The user recognition confidence data 811 may also include the user IDs corresponding to the potential user(s) who spoke the utterance.

In addition, the user recognition component 802 may use secondary data 809 to inform user recognition processing. Thus, a trained model or other component of the user recognition component 802 may be trained to take secondary data 809 as an input feature when performing recognition. Secondary data 809 may include a wide variety of data types depending on system configuration and may be made available from other sensors, devices, or storage such as user profile data 502, etc. The second data 809 may include a time of day at which the audio data was captured, a day of a week in which the audio data was captured, the text data 300, and/or the NLU results 385.

In one example, secondary data 809 may include image data or video data. For example, facial recognition may be performed on image data or video data received from the speech-controlled device 110 from which the audio data 111 was received. Facial recognition may be performed by the user recognition component 802, or another component of the server(s) 120. The output of the facial recognition process may be used by the user recognition component 802. That is, facial recognition output data may be used in conjunction with the comparison of the features/vectors of the audio data 111 and training data 805 to perform more accurate user recognition.

The secondary data 809 may also include location data of the speech-controlled device 110. The location data may be specific to a building within which the speech-controlled device 110 is located. For example, if the speech-controlled device 110 is located in user A's bedroom, such location may increase user recognition confidence data associated with user A, but decrease user recognition confidence data associated with user B.

The secondary data 809 may further include type data indicating a type of the speech-controlled device 110. Different types of speech-controlled devices may include, for example, a smart watch, a smart phone, a tablet computer, and a vehicle. The type of the speech-controlled device 110 may be indicated in a profile associated with the speech-controlled device 110. For example, if the speech-controlled device 110 from which the audio data 111 was received is a smart watch or vehicle belonging to user A, the fact that the speech-controlled device 110 belongs to user A may increase user recognition confidence data associated with user A, but decrease user recognition confidence data associated with user B.

The secondary data 809 may additionally include geographic coordinate data associated with the speech-controlled device 110. For example, a profile associated with a vehicle may indicate multiple users (e.g., user A and user B). The vehicle may include a global positioning system (GPS) indicating latitude and longitude coordinates of the vehicle when the audio data 111 is captured by the vehicle. As such, if the vehicle is located at a coordinate corresponding to a work location/building of user A, such may increase user recognition confidence data associated with user A, but decrease user recognition confidence data of all other users indicated in the profile associated with the vehicle. Global coordinates and associated locations (e.g., work, home, etc.) may be indicated in a user profile associated with the speech-controlled device 110. The global coordinates and associated locations may be associated with respective users in the user profile.

The secondary data 809 may also include other data/signals about activity of a particular user that may be useful in performing user recognition of an input utterance. For example, if a user has recently entered a code to disable a home security alarm, and the utterance corresponds to a device at the home, signals from the home security alarm about the disabling user, time of disabling, etc. may be reflected in the secondary data 809 and considered by the user recognition component 802. If a mobile device (such as a phone, Tile, dongle, or other device) known to be associated with a particular user is detected proximate to (for example physically close to, connected to the same WiFi network as, or otherwise nearby) the speech-controlled device 110, this may be reflected in the secondary data 809 and considered by the user recognition component 802.

Depending on system configuration, the secondary data 809 may be configured to be included in the vector representation of the user recognition feature/vector data 609 (for example using encoder 750) so that all the data relating to the utterance to be processed by the scoring component 822 may be included in a single vector. Alternatively, the secondary data 809 may be reflected in one or more different data structures to be processed by the scoring component 822.

As shown in FIG. 8, the ASR component 250 may output text data 300, which in turn is processed by the NLU component 260. The results 385 of NLU processing performed by the NLU component 260 and the user recognition confidence data 811 output by the user recognition component 802 may be sent to one or more applications, represented by command processor(s) 290. The command processor(s) 290 that receives the NLU results 385 and the user recognition confidence score data 811 may be determined by the server(s) 120 as corresponding to content responsive to the utterance in the audio data 111. For example, if the audio data 111 includes the utterance "Play my music," the NLU results 385 and user recognition confidence data 811 may be sent to a music playing command processor 290. If user recognition confidence data 811 associated with a single user is passed to the command processor(s) 290, the command processor(s) 290 may identify content responsive to the utterance and associated with the user. If, instead, user recognition confidence score data 811 associated with multiple users is passed to the command processor(s) 290, the command processor(s) 290 may identify content responsive to the utterance and associated with the user associated with the highest recognition confidence.

Various machine learning techniques may be used to train and operate models to perform various steps described above, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 9:
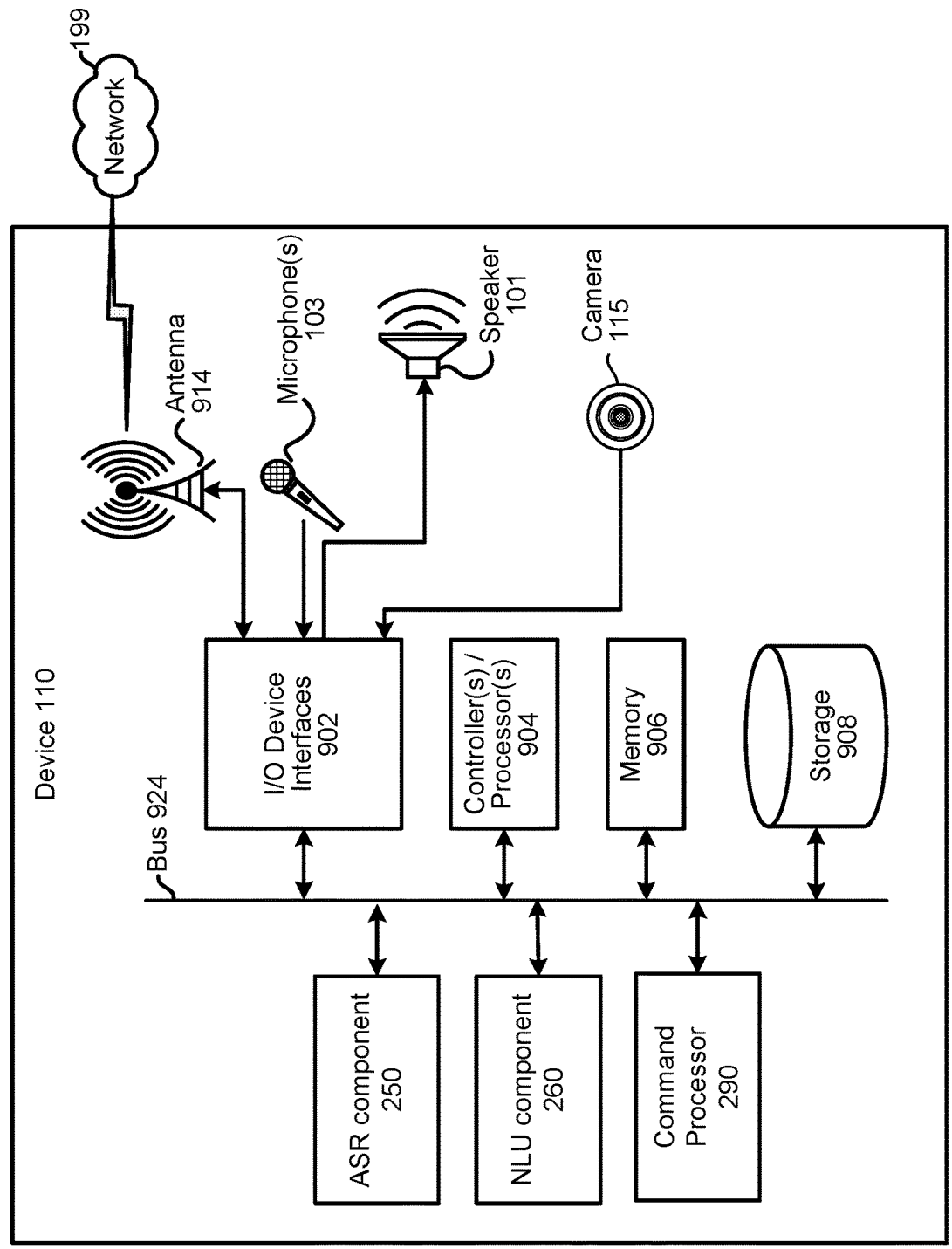
FIG. 9 is a block diagram conceptually illustrating example components of a device according to embodiments of the present disclosure.
Figure 10:
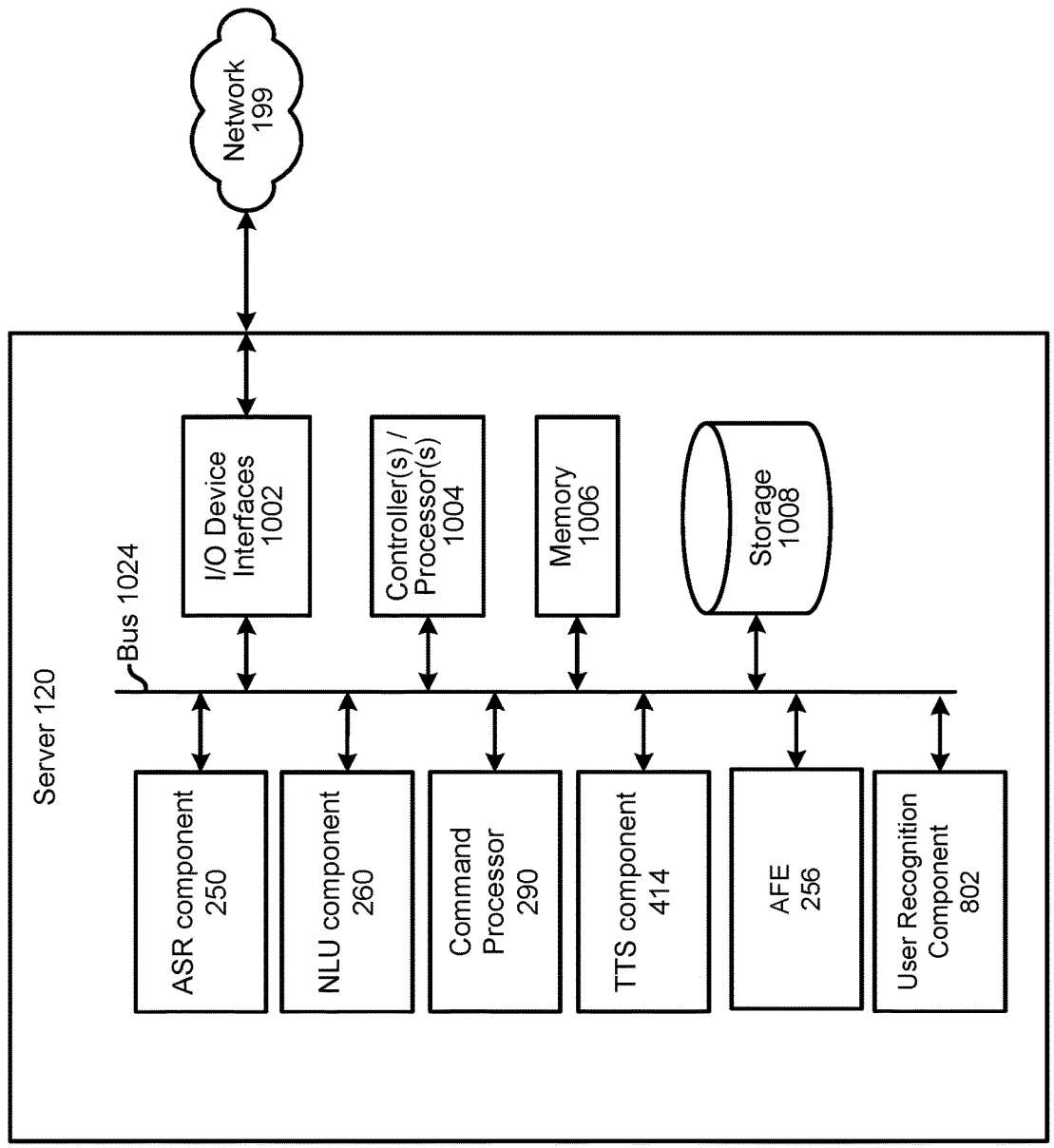
FIG. 10 is a block diagram conceptually illustrating example components of a server according to embodiments of the present disclosure.

FIG. 9 is a block diagram conceptually illustrating a user device 110 (e.g., the speech-controlled device 110 described herein) that may be used with the described system. FIG. 10 is a block diagram conceptually illustrating example components of a remote device, such as the server 120 that may assist with ASR processing, NLU processing, or command processing. Multiple servers 120 may be included in the system 100, such as one server 120 for performing ASR, one server 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (904/1004), that may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive (MRAM) and/or other types of memory. Each device (110/120) may also include a data storage component (908/1008), for storing data and controller/processor-executable instructions. Each data storage component may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (902/1002).

Computer instructions for operating each device (110/120) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each device (110/120) includes input/output device interfaces (902/1002). A variety of components may be connected through the input/output device interfaces (902/1002), as will be discussed further below. Additionally, each device (110/120) may include an address/data bus (924/1024) for conveying data among components of the respective device. Each component within a device (110/120) may also be directly connected to other components in addition to (or instead of) being connected to other components across the bus (924/1024).

Referring to FIG. 9, the device 110 may include input/output device interfaces 902 that connect to a variety of components such as an audio output component such as a speaker 101, a wired headset or a wireless headset (not illustrated), or other component capable of outputting audio. The device 110 may also include an audio capture component. The audio capture component may be, for example, a microphone 103 or array of microphones, a wired headset or a wireless headset (not illustrated), etc. The microphone 103 may be configured to capture audio. If an array of microphones is included, approximate distance to a sound's point of origin may be determined by acoustic localization based on time and amplitude differences between sounds captured by different microphones of the array. The device 110 may additionally include an image or video capture component, such as the camera 115. The camera 115 may be configured to capture data used to perform facial recognition, and ultimately user recognition.

For example, via antenna(s) 914, the input/output device interfaces 902 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

Referring to FIG. 10, the server 120 may include a user recognition component 802 configured to perform user recognition as described herein. The server 120 may also be configured with the TTS component 414, AFE 256, or other components as described herein.

The device 110 and/or the server 120 may include an ASR component 250. The ASR component 250 in the device 110 may be of limited or extended capabilities. The ASR component 250 may include the language models 254 stored in ASR model storage component 252. If limited speech recognition is included, the ASR component 250 may be configured to identify a limited number of words, whereas extended speech recognition may be configured to recognize a much larger range of words.

The device 110 and/or the server 120 may include a limited or extended NLU component 260. The NLU component 260 in the device 110 may be of limited or extended capabilities. The NLU component 260 may comprise the name entity recognition component 262, the intent classification component 264, and/or other components. The NLU component 260 may also include a stored knowledge base and/or entity library, or those storages may be separately located.

The device 110 and/or the server 120 may also include the command processor 290 configured to execute commands/functions associated with a spoken utterance as described herein.

As noted above, multiple devices may be employed in a single speech processing system. In such a multi-device system, each of the devices may include different components for performing different aspects of the speech processing. The multiple devices may include overlapping components. The components of the device 110 and the server 120, as illustrated in FIGS. 9 and 10, are exemplary, and may be located as a stand-alone device or may be included, in whole or in part, as a component of a larger device or system.

Figure 11:
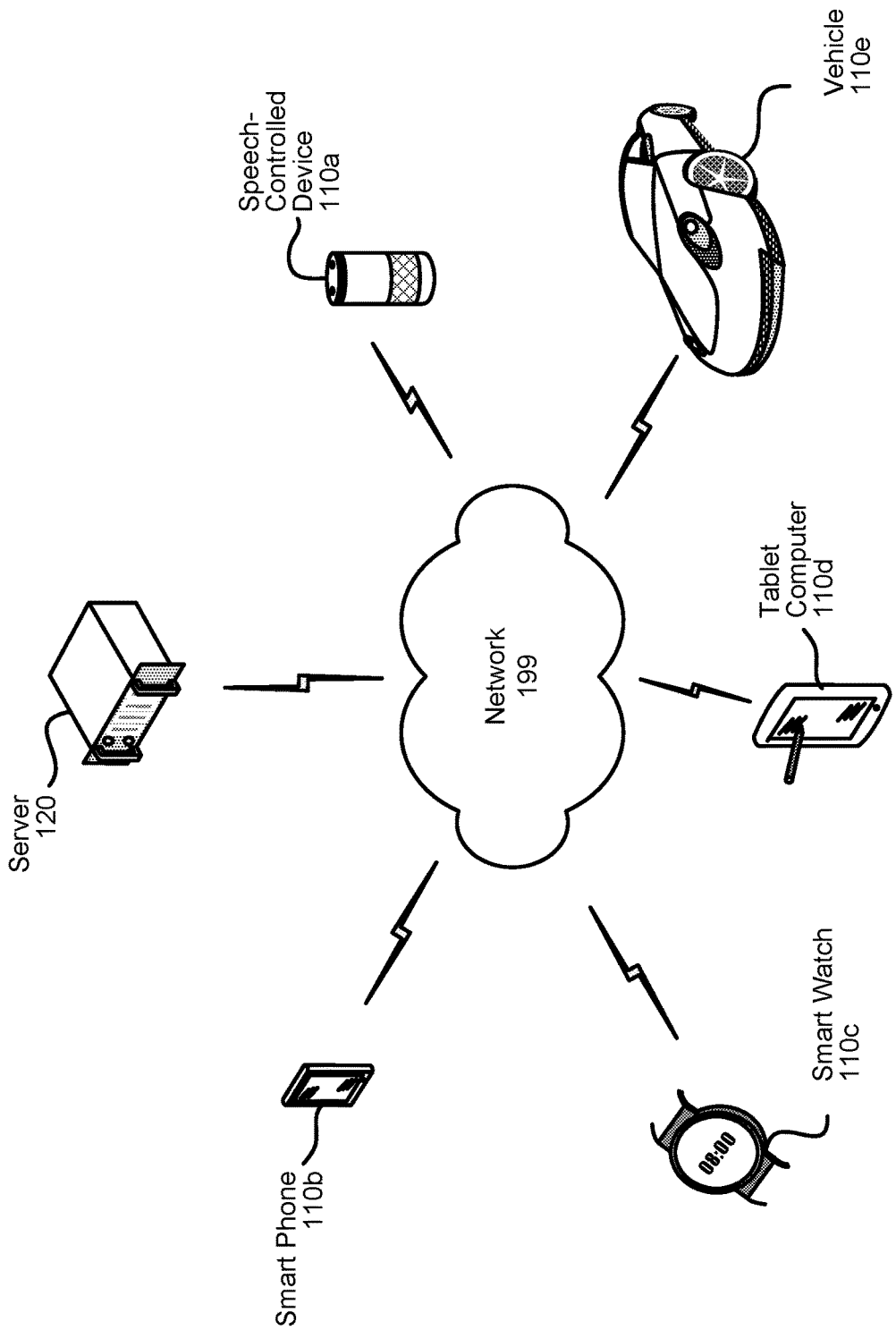
FIG. 11 illustrates an example of a computer network for use with the system.

As illustrated in FIG. 11, multiple devices (120, 110a-110e) may contain components of the system 100 and the devices may be connected over a network 199. The network 199 may include a local or private network or may include a wide network such as the Internet. Devices may be connected to the network 199 through either wired or wireless connections. For example, the speech-controlled device 110a, a smart phone 110b, a smart watch 110c, a tablet computer 110d, and/or a vehicle 110e may be connected to the network 199 through a wireless service provider, over a WiFi or cellular network connection, or the like. Other devices are included as network-connected support devices, such as the server 120 or others. The support devices may connect to the network 199 through a wired connection or wireless connection. Networked devices may capture audio using one-or-more built-in or connected microphones 103 or audio capture devices, with processing performed by ASR, NLU, or other components of the same device or another device connected via the network 199, such as the ASR component 250, the NLU component 260, etc. of one or more servers 120.

The concepts disclosed herein may be applied within a number of different devices and computer systems, including, for example, general-purpose computing systems, speech processing systems, object recognition (e.g., facial recognition) systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, speech processing, object recognition (e.g., facial recognition), and user recognition should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the components and engines may be implemented as in firmware or hardware, such as the AFE 256, which comprises, among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, from a speech-controlled device, input audio data corresponding to an utterance;
   determining first audio features of the input audio data, the first audio features being used to perform automatic speech recognition (ASR);
   performing ASR using the first audio features to generate text data and ASR confidence data;
   determining second audio features of the input audio data, the second audio features being used to perform user recognition;
   determining, from a user profile associated with the speech-controlled device, first training data associated with a first user and second training data associated with a second user;
   analyzing the second audio features with respect to the first training data to determine a first user recognition score indicating a likelihood that the first user spoke the utterance;
   analyzing the second features with respect to the second training data to determine a second user recognition score indicating a likelihood that the second user spoke the utterance;
   determining a difference between the first user recognition score and the second user recognition score;
   determining, based at least in part on the difference and the ASR confidence data, a user recognition confidence score;
   determining that the user recognition confidence score is above a confidence threshold; and
   causing output content to be determined.

2. The computer-implemented method of claim 1, further comprising:
   receiving, from the speech-controlled device, image data captured using a camera associated with the speech-controlled device;
   analyzing the image data with respect to first training image data associated with the first user to determine a second user recognition score; and
   analyzing the image data with respect to second training image data associated with the second user to determine a third user recognition score.

3. The computer-implemented method of claim 1, further comprising:
   determining the user recognition confidence score corresponds to a group score indicator selected from a high indicator, a medium indicator, or a low indicator;
   determining the user recognition confidence score is above a confidence threshold by determining the user recognition confidence score corresponds to the medium indicator or the high indicator; and
   determining, based on determining the user recognition confidence score corresponds to the medium indicator or the high indicator, the output content.

4. The computer-implemented method of claim 1, wherein the first user recognition score corresponds to a first high group score indicator and the second user recognition score corresponds to a second high group score indicator, and wherein the computer-implemented method further comprises:
   determining a first user recognition number associated with the first user;
   determining a second user recognition number associated with the second user; and
   determining the first user recognition score is greater than the second user recognition score by determining the first user recognition number is greater than the second user recognition number.

5. A system comprising:
   at least one processor; and
   memory including instructions operable to be executed by the at least one processor to configure the system to:
   receive input audio data corresponding to an utterance;
   perform, based at least in part on the input audio data, automatic speech recognition (ASR);
   determine text data corresponding to the utterance;
   determine ASR confidence data;
   determine, based at least in part on the input audio data, a first user profile associated with a person;
   determine, from the first user profile associated with the person, first training data associated with the first person;
   analyze, the input audio data with respect to the first training data to determine a user recognition score;
   determine, based at least in part on the ASR confidence data and the user recognition score, a confidence score indicating a likelihood that the person associated with the first user profile spoke the utterance; and cause an action to be performed based on the confidence score.

6. The system of claim 5, wherein the memory further comprises instructions that further configure the system to:
perform ASR further comprise instructions to determine first features of the input audio data; and
determine the first user comprise instructions to determine second features of the input audio data, the first features and the second features being at least partially different.

7. The system of claim 5, wherein the memory further comprises instructions that further configure the system to:
receive image data;
perform facial recognition on the image data; and
determine, based at least in part on the facial recognition, the confidence score.

8. The system of claim 5, wherein the memory further comprises instructions that further configure the system to:
determine a second confidence score using at least one of a location of a device within a building, a type of the device, or a geographic location of the device.

9. The system of claim 5, wherein the memory further comprises instructions that further configure the system to:
determine, based at least in part on the input audio data, a second user profile associated with a second person; and
determine, based at least in part on the ASR confidence data, a second confidence score that the second person associated with the second user profile spoke the utterance.

10. The system of claim 5, wherein the confidence score is a binned value, the binned value being one of low, medium or high.

11. The system of claim 5, wherein the memory further comprises instructions that further configure the system to:
determine the confidence score is above a confidence score threshold; and
determine, in response to determining the confidence score is above the confidence score threshold, content data associated with the first user profile and responsive to the utterance.

12. The system of claim 5, wherein the memory further comprises instructions that further configure the system to determine that the confidence score comprise instructions to determine the confidence score based at least in part on one or more of security alarm data or data indicating a proximity of a first device to a second device.

13. A computer-implemented method comprising:
receiving input audio data corresponding to an utterance;
performing, based at least in part on the input audio data, automatic speech recognition (ASR);
determining text data corresponding to the utterance;
determining ASR confidence data;
determining, based at least in part on the input audio data, a first user profile associated with a person;
determining, from the first user profile associated with the person, first training data associated with the first person;
analyzing, the input audio data with respect to the first training data to determine a user recognition score;
determining, based at least in part on the ASR confidence data and the user recognition score, a confidence score indicating a likelihood that the person associated with the first user profile spoke the utterance; and
causing an action to be performed based on the confidence score.

14. The computer-implemented method of claim 13, wherein:
performing ASR comprises determining first features of the input audio data; and
determining the first user comprises determining second features of the input audio data, the first features and the second features being at least partially different.

15. The computer-implemented method of claim 13, further comprising:
receiving image data;
performing facial recognition on the image data; and
determining, based at least in part on the facial recognition, the confidence score.

16. The computer-implemented method of claim 13, further comprising:
determining a second confidence score using at least one of a location of a device within a building, a type of the device, or a geographic location of the device.

17. The computer-implemented method of claim 13, further comprising:
determining, based at least in part on the input audio data, a second user profile associated with a second person; and
determining, based at least in part on the ASR confidence data, a second confidence score that the second person associated with the second user profile spoke the utterance.

18. The computer-implemented method of claim 13, wherein the confidence score is a binned value, the binned value being one of low, medium or high.

19. The computer-implemented method of claim 13, further comprising:
determining the confidence score is above a confidence score threshold; and
determining, in response to determining the confidence score is above the confidence score threshold, content data associated with the first user profile and responsive to the utterance.

20. The computer-implemented method of claim 13, wherein determining the confidence score further comprises determining the confidence score based at least in part on one or more of security alarm data or data indicating a proximity of a first device to a second device.

* * * * *